United States Patent
Young et al.

(10) Patent No.: US 9,789,893 B2
(45) Date of Patent: Oct. 17, 2017

(54) STROLLER TRICYCLE

(71) Applicant: RADIO FLYER INC., Chicago, IL (US)

(72) Inventors: Matthew E. Young, Chicago, IL (US); Collin Ostergaard, Chicago, IL (US); Jason Fitzwater, Chicago, IL (US)

(73) Assignee: Radio Flyer Inc., Chicago, IL (US)

( * ) Notice: Subject to any disclaimer, the term of this patent is extended or adjusted under 35 U.S.C. 154(b) by 0 days.

(21) Appl. No.: 15/279,070

(22) Filed: Sep. 28, 2016

(65) Prior Publication Data

US 2017/0088158 A1  Mar. 30, 2017

Related U.S. Application Data

(60) Provisional application No. 62/234,360, filed on Sep. 29, 2015.

(51) Int. Cl.

| | |
|---|---|
| *B62B 7/00* | (2006.01) |
| *B62B 7/12* | (2006.01) |
| *B62K 9/02* | (2006.01) |
| *B62B 7/04* | (2006.01) |
| *B62B 7/14* | (2006.01) |

(Continued)

(52) U.S. Cl.
CPC ............... *B62B 7/12* (2013.01); *B62B 7/044* (2013.01); *B62B 7/142* (2013.01); *B62J 1/08* (2013.01); *B62K 9/02* (2013.01); *B62K 13/00* (2013.01); *B62K 13/04* (2013.01)

(58) Field of Classification Search
CPC ......... B62B 7/044; B62B 7/006; B62B 7/145; B62B 7/00
See application file for complete search history.

(56) References Cited

U.S. PATENT DOCUMENTS

| 94,056 A | 8/1869 | Allen |
|---|---|---|
| 638,112 A | 11/1899 | Graham |

(Continued)

FOREIGN PATENT DOCUMENTS

| CN | 203246544 | 10/2013 |
|---|---|---|
| CN | 204368241 | 6/2015 |

(Continued)

OTHER PUBLICATIONS

MyRider® Chariot/MyRider™ Trikes, http://www.angelesstore.com/index.php/MyRider™-Trikes/myrider-chariot.html, at least as early as Mar. 16, 2013.

(Continued)

*Primary Examiner* — John Walters
*Assistant Examiner* — James Triggs
(74) *Attorney, Agent, or Firm* — McDermott Will & Emery LLP

(57) ABSTRACT

A ride-on vehicle is providing having a frame, a plurality of wheels connected to the frame, a receiver extending from the frame and a seat rotatedly connected in the receiver via a seat post. The receiver extends from the frame at a first acute angle greater than 0° with respect to a vertical axis, and the seat post extends from a bottom of the seat at a second acute angle greater than 0° with respect to the vertical axis. As such, when the seat is positioned in the rear facing orientation the seat is positioned at an acute angle greater than 0° with respect to a horizontal axis.

25 Claims, 19 Drawing Sheets

(51) Int. Cl.
  *B62K 13/04* (2006.01)
  *B62J 1/08* (2006.01)
  *B62K 13/00* (2006.01)

(56) References Cited

U.S. PATENT DOCUMENTS

| | | |
|---|---|---|
| 1,397,174 A | 11/1921 | Morwood |
| 2,183,534 A | 12/1939 | Bernier |
| 2,194,161 A | 3/1940 | Cobb |
| 2,619,364 A | 11/1952 | Carson |
| 2,630,333 A | 3/1953 | Petersen |
| 2,806,709 A | 9/1957 | Watson |
| 2,816,775 A | 12/1957 | Costello |
| 2,914,336 A | 11/1959 | Hibben, Jr. et al. |
| 3,265,402 A | 8/1966 | Snyder |
| 3,432,015 A | 3/1969 | Schwerdhofer |
| 3,485,507 A | 12/1969 | Christof |
| 3,905,618 A | 9/1975 | Miranda |
| 3,954,283 A | 5/1976 | Boehm et al. |
| 4,142,736 A | 3/1979 | Ackerfeldt et al. |
| 4,168,846 A | 9/1979 | Carren |
| 4,457,529 A | 7/1984 | Shamie et al. |
| 4,474,388 A | 10/1984 | Wagner |
| 4,546,991 A | 10/1985 | Allen et al. |
| 4,657,270 A | 4/1987 | Allen et al. |
| 4,702,486 A | 10/1987 | Tsuchie |
| D300,619 S | 4/1989 | Phinney et al. |
| 4,840,260 A | 6/1989 | Josereau |
| 4,850,733 A | 7/1989 | Shook |
| 5,028,066 A | 7/1991 | Garth |
| 5,074,577 A | 12/1991 | Kim |
| 5,087,040 A | 2/1992 | Wu |
| RE33,939 E | 5/1992 | Cheng |
| D332,591 S | 1/1993 | Reely |
| D334,157 S | 3/1993 | Tonelli |
| 5,201,540 A | 4/1993 | Wu |
| D337,973 S | 8/1993 | Mariol |
| 5,322,487 A | 6/1994 | Nagano |
| 5,356,356 A | 10/1994 | Hildebrandt et al. |
| D355,870 S | 2/1995 | Dieudonne |
| 5,409,253 A | 4/1995 | Cheng |
| 5,586,778 A | 12/1996 | Lindh et al. |
| 5,590,896 A | 1/1997 | Eichhorn |
| 5,660,435 A | 8/1997 | Eichhorn |
| 5,667,239 A | 9/1997 | Yang |
| 5,765,857 A | 6/1998 | Hsiao |
| 5,765,871 A | 6/1998 | Wyman et al. |
| 5,829,585 A | 11/1998 | Kao et al. |
| 5,887,889 A | 3/1999 | Andrus |
| 5,924,713 A | 7/1999 | Li |
| 5,954,349 A | 9/1999 | Rutzel |
| 6,007,031 A | 12/1999 | Tang |
| D427,112 S | 6/2000 | Chaudeurge |
| 6,079,718 A | 6/2000 | Liao |
| 6,102,431 A | 8/2000 | Sutherland et al. |
| 6,105,998 A | 8/2000 | Baechler et al. |
| 6,120,048 A | 9/2000 | Li |
| 6,152,473 A | 11/2000 | Shih |
| 6,152,476 A | 11/2000 | Huang |
| D435,235 S | 12/2000 | de Oliveira |
| 6,155,579 A | 12/2000 | Eyman et al. |
| D436,560 S | 1/2001 | Golenz |
| D436,896 S | 1/2001 | Chiappepta et al. |
| D436,897 S | 1/2001 | Chiappepta et al. |
| 6,299,194 B1 | 10/2001 | Chen |
| 6,302,421 B1 | 10/2001 | Lee |
| 6,338,403 B1 | 1/2002 | Costin et al. |
| D461,145 S | 8/2002 | Chiappetta et al. |
| 6,533,311 B2 | 3/2003 | Kaneko et al. |
| 6,575,486 B2 | 6/2003 | Ma |
| 6,609,723 B2 | 8/2003 | Chuang |
| D480,024 S | 9/2003 | Gunter et al. |
| 6,612,598 B2 | 9/2003 | Wu |
| D480,665 S | 10/2003 | Gunter et al. |
| 6,634,711 B2 | 10/2003 | Phillips et al. |
| 6,644,676 B2 | 11/2003 | Wu |
| D484,073 S | 12/2003 | Heinemann et al. |
| 6,666,470 B2 | 12/2003 | Li |
| D485,513 S | 1/2004 | de Oliveira |
| 6,682,090 B2 | 1/2004 | Chen |
| 6,685,206 B1 | 2/2004 | Blake |
| 6,685,207 B1 | 2/2004 | Blake |
| 6,719,319 B2 | 4/2004 | Liao |
| 6,722,690 B2 | 4/2004 | Lan |
| 6,726,233 B1 | 4/2004 | Li |
| 6,739,616 B2 | 5/2004 | Lin |
| 6,752,453 B1 | 6/2004 | Yapp |
| 6,767,028 B2 | 7/2004 | Britton et al. |
| 6,789,808 B2 | 9/2004 | Yang |
| 6,840,527 B1 | 1/2005 | Michelau et al. |
| 6,869,096 B2 | 3/2005 | Allen et al. |
| 6,874,802 B2 | 4/2005 | Gunter et al. |
| 6,935,649 B2 | 8/2005 | Lim |
| 6,966,572 B2 | 11/2005 | Michelau et al. |
| 7,000,928 B2 | 2/2006 | Liao |
| 7,000,935 B2 | 2/2006 | Gunter et al. |
| 7,000,939 B2 | 2/2006 | Shapiro |
| D525,568 S | 7/2006 | Baron |
| 7,077,420 B1 | 7/2006 | Santoski |
| 7,086,657 B2 | 8/2006 | Michelau et al. |
| 7,128,333 B2 | 10/2006 | Reimers et al. |
| 7,137,644 B2 | 11/2006 | Kimberley |
| 7,210,696 B2 | 5/2007 | Kettler et al. |
| 7,219,920 B2 | 5/2007 | Lin |
| 7,281,725 B1 | 10/2007 | Gunter et al. |
| D555,045 S | 11/2007 | On |
| 7,296,819 B2 | 11/2007 | Cunningham |
| 7,300,066 B2 | 11/2007 | Kettler et al. |
| 7,347,443 B2 | 3/2008 | Barton |
| D567,719 S | 4/2008 | Grossman |
| D571,866 S | 6/2008 | On |
| 7,390,012 B2 | 6/2008 | Church |
| 7,396,039 B2 | 7/2008 | Valdez et al. |
| 7,422,230 B2 | 9/2008 | Chuan |
| D582,489 S | 12/2008 | Badanjo |
| D593,910 S | 6/2009 | Calvin et al. |
| D594,788 S | 6/2009 | Hartlaub et al. |
| D598,331 S | 8/2009 | Tongish et al. |
| 7,591,479 B2 | 9/2009 | Golias |
| D604,777 S | 11/2009 | On |
| 7,621,842 B2 | 11/2009 | Kamiya et al. |
| 7,632,035 B2 | 12/2009 | Cheng |
| 7,658,252 B2 | 2/2010 | Shapiro |
| 7,694,980 B2 | 4/2010 | Dotsey et al. |
| 7,722,115 B2 | 5/2010 | Biro |
| 7,766,359 B2 | 8/2010 | Klevana et al. |
| 7,798,515 B2 | 9/2010 | Valdez et al. |
| D627,265 S | 11/2010 | On |
| 7,871,099 B2 | 1/2011 | Gilbertson et al. |
| 7,909,353 B2 | 3/2011 | Nolan et al. |
| 7,934,729 B2 | 5/2011 | Murphy et al. |
| D645,381 S | 9/2011 | Bricker et al. |
| 8,061,732 B2 | 11/2011 | Song et al. |
| 8,104,777 B2 | 1/2012 | Liao |
| D659,054 S | 5/2012 | Agati et al. |
| D659,055 S | 5/2012 | Agati et al. |
| D659,056 S | 5/2012 | Bricker et al. |
| 8,191,920 B2 | 6/2012 | Zhang |
| 8,226,111 B2 | 7/2012 | Valdez et al. |
| 8,262,114 B2 | 9/2012 | Jessie, Jr. |
| 8,313,118 B2 | 11/2012 | Aiken |
| 8,844,960 B2 | 9/2014 | Young et al. |
| D714,693 S | 10/2014 | Bartels |
| 8,991,844 B2 | 3/2015 | Bricker et al. |
| D735,090 S | 7/2015 | Baron |
| 9,114,842 B2 | 8/2015 | Bartels |
| 2002/0093177 A1 | 7/2002 | Chen |
| 2003/0141695 A1 | 7/2003 | Chen |
| 2003/0201621 A1 | 10/2003 | Jang |
| 2005/0035646 A1 | 2/2005 | Everett |
| 2005/0110239 A1 | 5/2005 | Michelau et al. |
| 2005/0247506 A1 | 11/2005 | Rondeau et al. |
| 2007/0045983 A1 | 3/2007 | Hong |
| 2007/0222172 A1 | 9/2007 | Chen |

(56) References Cited

U.S. PATENT DOCUMENTS

| | | |
|---|---|---|
| 2008/0012268 A1 | 1/2008 | Lee |
| 2008/0197599 A1* | 8/2008 | Comstock ............... B62K 5/02 280/266 |
| 2008/0277901 A1 | 11/2008 | Catelli |
| 2009/0008164 A1 | 1/2009 | Shapiro |
| 2009/0115151 A1 | 5/2009 | Van Dijk |
| 2010/0289244 A1 | 11/2010 | Grossman |
| 2010/0308550 A1 | 12/2010 | Li et al. |
| 2010/0308561 A1 | 12/2010 | Diekman et al. |
| 2010/0314855 A1 | 12/2010 | Mival et al. |
| 2011/0012325 A1 | 1/2011 | Gower et al. |
| 2011/0074125 A1 | 3/2011 | Aiken et al. |
| 2011/0278815 A1 | 11/2011 | Khare |
| 2012/0104712 A1 | 5/2012 | Kobayashi |
| 2012/0306179 A1 | 12/2012 | Jessie, Jr. |
| 2013/0056949 A1 | 3/2013 | Bricker et al. |
| 2014/0103616 A1 | 4/2014 | Young |
| 2014/0217696 A1 | 8/2014 | Bartels |
| 2015/0210341 A1 | 7/2015 | Chen |

FOREIGN PATENT DOCUMENTS

| | | |
|---|---|---|
| CN | 204368368 | 6/2015 |
| CN | 303233453 | 6/2015 |
| CN | 303586188 | 2/2016 |
| CN | 205147140 | 4/2016 |
| EP | 0148979 | 7/1985 |
| EP | 1937541 | 4/2007 |
| JP | 2003320983 | 11/2003 |
| JP | 2004099021 | 4/2004 |
| JP | 2006111222 | 4/2006 |

OTHER PUBLICATIONS

MyRider® Tandom, http://www.angelesstore.com/index.php/MyRider™-Trikes/myrider-tandem.html, at least as early as Mar. 16, 2013.

3-in-1 SpinTrike Bike, http://www.toysrus.ca/product/index.isp-?productId+87124876&imageIndex+7, at least as early as Mar. 5, 2015.

Aluminum 3-in-1 Trike, http://www.toysrus.ca/product/index.isp-?productId+80573176, at least as early as Mar. 5, 2015.

"Ultimate Classic Trike," Parent's Choice—Children's Media and Toy Reviews, Fall 2009 [online], [retrieved on Jul. 20, 2016]. Retrieved from the Internet <URL: http://www.parents-choice.org/product_cfm?product_id=26889&StepNum=1&award=aw>.

"Smart Trike DX 3-In-1 Kids Tricycle." Lorett Co., Nov. 14, 2012 [online], [retrieved on Jul. 20, 2016]. Retrieved from the Internet <URL: http://www.lorettco.com/smart-trike-dx-3-in-1-kids-tricycle/>.

International Search Report for related International Patent Application No. PCT/US2016/054391 dated Dec. 30, 2016.

* cited by examiner

STROLLER TRICYCLE

CROSS-REFERENCE TO RELATED APPLICATIONS

This application claims the benefit of U.S. Provisional Patent Application No. 62/234,360, filed Sep. 29, 2015, which is expressly incorporated herein by reference and made a part hereof.

FEDERALLY SPONSORED RESEARCH OR DEVELOPMENT

Not Applicable.

TECHNICAL FIELD

The present disclosure generally relates to a ride-on vehicle, and more particularly, to a tricycle having a front facing seat that converts to a rear facing seat to operate as a stroller, and wherein the seat base is positioned angularly offset with respect to a horizontal axis in the rear facing mode.

BACKGROUND

Tricycles, strollers and other ride-on vehicles are well known in the art. While such independent tricycles, strollers and ride-on vehicles according to the prior art provide a number of advantages, they nevertheless have certain limitations, including being limited in usefulness as a child grows older. They are also cumbersome in adding and removing certain accessories. The disclosed embodiments seek to overcome certain of these limitations and other drawbacks of the prior art, and to provide new features not heretofore available. A full discussion of the features and advantages of the various embodiments is deferred to the following detailed description, which proceeds with reference to the accompanying drawings.

SUMMARY

According to one embodiment, the disclosed subject technology relates to a ride-on vehicle, such as a tricycle, with a seat that can be adjusted to move from a forward facing orientation to a rear facing orientation, without removing the seat from a receiver in the frame of the ride-on vehicle.

The disclosed subject technology further relates to a ride-on vehicle, comprising: a frame; a plurality of wheels supporting the frame; a receiver extending from the frame at a first acute angle greater than 0° with respect to a vertical axis; and, a seat rotatedly connected to the frame, the seat having a post extending from a bottom of the seat at a second acute angle greater than 0° with respect to the vertical axis, wherein the post is rotatedly received by the receiver of the frame, wherein one of the receiver and post have a first detent position for the seat and a second detent position for the seat, the second detent position being rotationally positioned approximately 180° from the first detent position, wherein the seat is forward facing in the first detent position, wherein the seat is rear facing in the second detent position, wherein a relationship between the post and the receiver causes the a bottom of the seat to be positioned in a generally horizontal orientation when the seat is positioned in the first detent and the bottom of the seat to be positioned at an acute angle greater than 0° with respect to a horizontal axis when the seat is positioned in the second detent.

The disclosed subject technology further relates to a ride-on vehicle, comprising: a frame; a plurality of wheels supporting the frame; a receiver extending from the frame at a first acute angle greater than 0° with respect to a vertical axis; and, a seat rotatedly connected to the frame, the seat having a mating member extending from a bottom of the seat at a second acute angle greater than 0° with respect to the vertical axis, wherein the mating member is rotatedly received by the receiver of the frame.

The disclosed subject technology further relates to a ride-on vehicle, comprising: a frame; a plurality of wheels supporting the frame; the frame having a receiver; a seat rotatedly connected to the receiver of the frame, a first rotational detent position for the seat with respect to the frame, the seat being positioned in a forward facing orientation in the first rotational detent position; and, a second rotational detent position for the seat with respect to the frame, the second detent position being rotationally positioned approximately 180° from the first detent position, the seat being positioned in a rear facing orientation in the second rotational detent position, wherein when the seat is positioned in the rear facing orientation a relationship between the seat and the receiver causes a bottom of the seat to only be positioned at an acute angle greater than 0° with respect to a horizontal axis.

The disclosed subject technology further relates to a ride-on vehicle, comprising: a frame; a plurality of wheels supporting the frame; a seat having a clamp post connected to a bottom of the seat, the clamp post comprising a base member, a swivel plate, and a spring loaded connector joining the swivel plate to the base member; and, a receiver tube extending from the frame, the receiver tube receiving the clamp post therein, wherein the swivel plate is rotatable with respect to the base member, wherein the base member of the clamp post is rotationally and longitudinally fixed to the receiver tube, and wherein the seat rotates with the swivel plate.

The disclosed subject technology further relates to a clamp post extending from the bottom of the seat and comprising a base member, a swivel plate, and a spring loaded connector joining the swivel plate to the base member. The disclosed subject technology further relates to vehicle having a separate clamp post connected to the bottom of the seat and received in the receiver.

The disclosed subject technology further relates to a vehicle wherein when the seat is positioned in a rear facing orientation a base portion of the seat is tilted at an acute angle greater than 0° with respect to a horizontal axis. In one embodiment, rotation of the seat within the receiver from a rear facing orientation to the forward facing orientation automatically causes the base portion of the seat to be positioned in the generally horizontal orientation, and wherein a relationship of the mating member and receiver prevents the base portion of the seat from being positioned in another orientation with respect to a horizontal axis when the seat is forward facing.

The disclosed subject technology further relates to a vehicle wherein when the seat is positioned in a forward facing orientation a base portion of the seat is generally horizontal. In one embodiment, rotation of the seat within the receiver from a forward facing orientation to the rear facing orientation automatically causes the base portion of the seat to be tilted at the acute angle greater than 0° with respect to the horizontal axis, and wherein a relationship of the post and receiver prevents the base portion of the seat from being positioned in another orientation with respect to the horizontal axis when the seat is rear facing.

The disclosed subject technology further relates to a vehicle where one of the receiver and mating member have a first detent position for the seat and a second detent position for the seat, the second detent position being rotationally positioned approximately 180° from the first detent position.

The disclosed subject technology further relates to a vehicle where the mating member has a spring loaded clamp with a first detent position and a second detent position, where the seat is positioned forward facing in the first detent position, and wherein the seat is positioned rearward facing in the second detent position.

The disclosed subject technology further relates to a vehicle where the receiver and mating member have only two detent positions for the seat, the second detent position being rotationally positioned approximately 180° from the first detent position.

The disclosed subject technology further relates to a vehicle wherein the seat rotates with respect to the frame about an axis angularly offset from the vertical axis. In one embodiment, a longitudinal axis of the receiver is angularly offset from the vertical axis. In another embodiment, a longitudinal axis of the mating member is angularly offset from the vertical axis.

The disclosed subject technology further relates to a vehicle where a receiver extends from the frame at a first acute angle greater than 0° with respect to a vertical axis, and a post extends from the bottom of the seat at a second acute angle greater than 0° with respect to the vertical axis, and wherein the post is rotatedly received by the receiver of the frame.

The disclosed subject technology further relates to a vehicle where the seat post extending from the seat and is rotationally received by the receiver, and the clamp post is positioned within the seat post.

The disclosed subject technology further relates to a vehicle where the receiver tube extends from the frame at a first acute angle greater than 0° with respect to a vertical axis, and wherein the clamp post extends at a second acute angle greater than 0° with respect to the vertical axis.

The disclosed subject technology further relates to a vehicle where the receiver tube extends at an angle between 5° and 15° with respect to the vertical axis. In another embodiment, the clamp post extends at an angle between 5° and 15° with respect to the vertical axis. In another embodiment, the first acute angle at which the receiver tube extends with respect to the vertical axis is the same angle as the second acute angle at which the clamp post extends with respect to the vertical axis.

The disclosed subject technology further relates to a vehicle where the seat is not removed from connection with the receiver tube during transition between the forward facing orientation and the rear facing orientation.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure.

DETAILED DESCRIPTION

Figure 1:
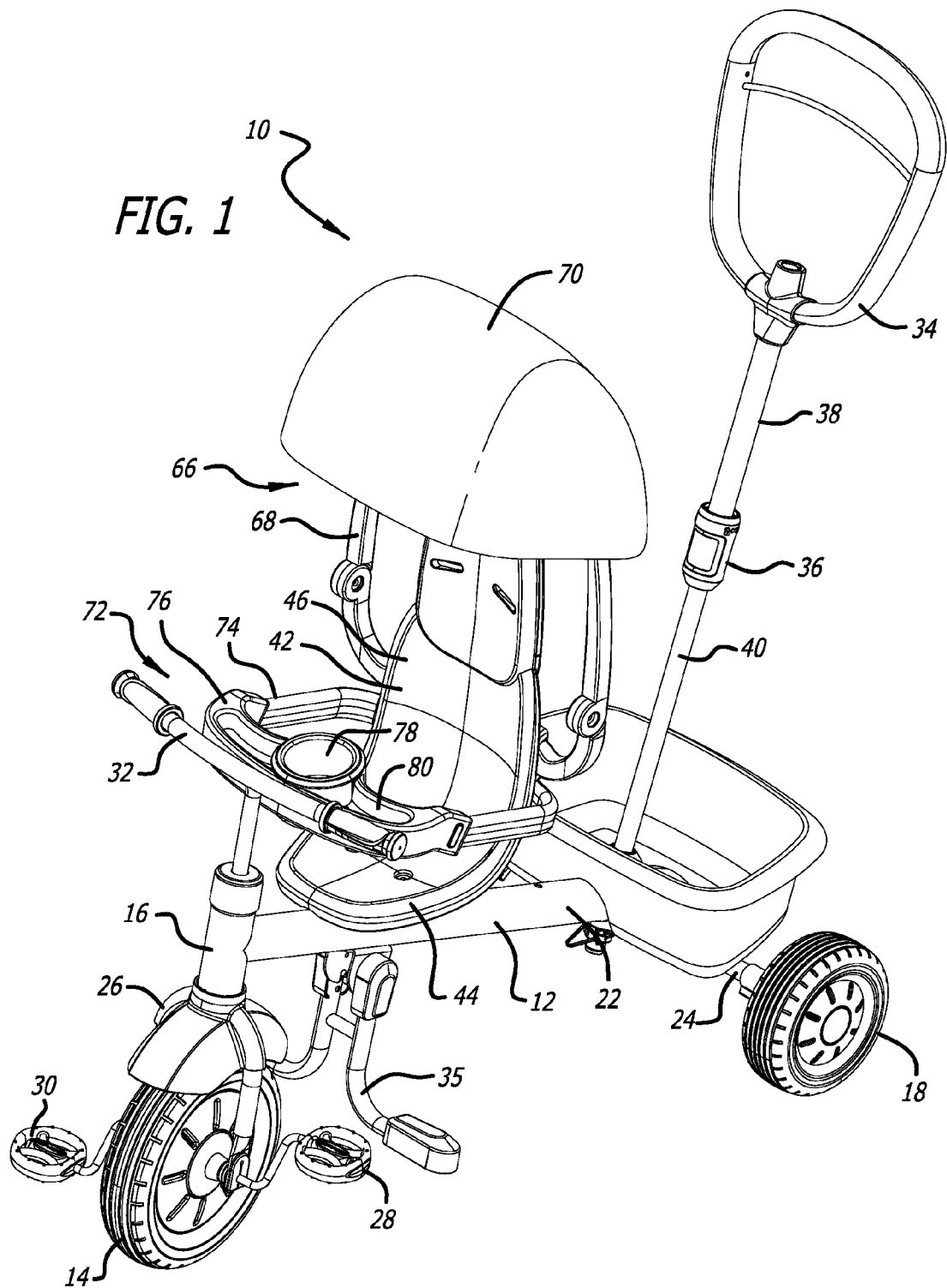
FIG. 1 is a front-top perspective view of a tricycle according to one embodiment.

While the convertible tricycle discussed herein is susceptible of embodiments in many different forms, the disclosure will show in the drawings, and will herein describe in detail, preferred embodiments with the understanding that the present description is to be considered as an exemplification of the principles of the convertible tricycle and are not intended to limit the broad aspects of the disclosure to the embodiments illustrated. Further, while a tricycle is disclosed, it is understood that many aspects of the disclosure related to additional types of ride-on vehicles, and as such the embodiments are not limited to tricycles.

The convertible tricycle is a product that can be used by children from the infant stage through the toddler stage, and into the adolescent stage and beyond. For example, the convertible tricycle can operate as a stroller with rear facing seat. The stroller may have a removable fabric frame, a retaining hoop, a tray, a canopy and a handle for the parent, or other person, to push and/or steer the stroller. As the child grows, the seat may be reversed to be forward facing. Additionally, the fabric frame, retaining hoop, tray, and canopy can be removed, independently as desired by the user, such that the tricycle operates as a push tricycle. In the push tricycle stage, the tricycle can be used as a traditional tricycle by the child, but also includes footrests if the child gets tired of pedaling and chooses to rest his or her feet on the footrest while the parent uses a handle to push and/or steer the tricycle. Finally, when the child no longer needs the parent handle and/or the footrests, they can likewise be independently removed for use as a traditional tricycle.

Referring now to the figures, and initially to FIGS. 1-5, in one embodiment a convertible ride-on vehicle 10, shown in many of the figures as a convertible tricycle 10 for exemplar purposes only, may include a frame 12, a front wheel 14 supporting a forward portion 16 of the frame 12, and second and third wheels 18, 20 supporting a rear portion 22 of the frame 12. Preferably, the second wheel 18 is rotatably supported at a first end of a rear axle 24, and the third wheel 20 is rotatably supported at a second end of the rear axle 24.

As shown in FIG. 1, the front wheel 14 is rotatably supported by a front fork 26 that in turn is rotatedly coupled to the forward portion 16 of the frame 12. A clutch mechanism (not shown) may be provided within the front wheel 14 so the tricycle 10 can be pushed and the front wheel 14 can rotate, even though a child positioned on the tricycle 10 may have their feet positioned on pedals 28, 30 and may be preventing the pedals 28, 30 from moving. A handlebar assembly 32 is coupled to the front fork 26 such that a turning of the handlebar assembly 32 turns the front wheel 14, and thus the tricycle 10. Additionally, a footrest 35 may be provided. The footrest 35 may be entirely removable from the tricycle 10. Further, the footrest 35 may be moveable between a use position and a storage position so that it does not interfere with the use of the pedals.

Figure 3:
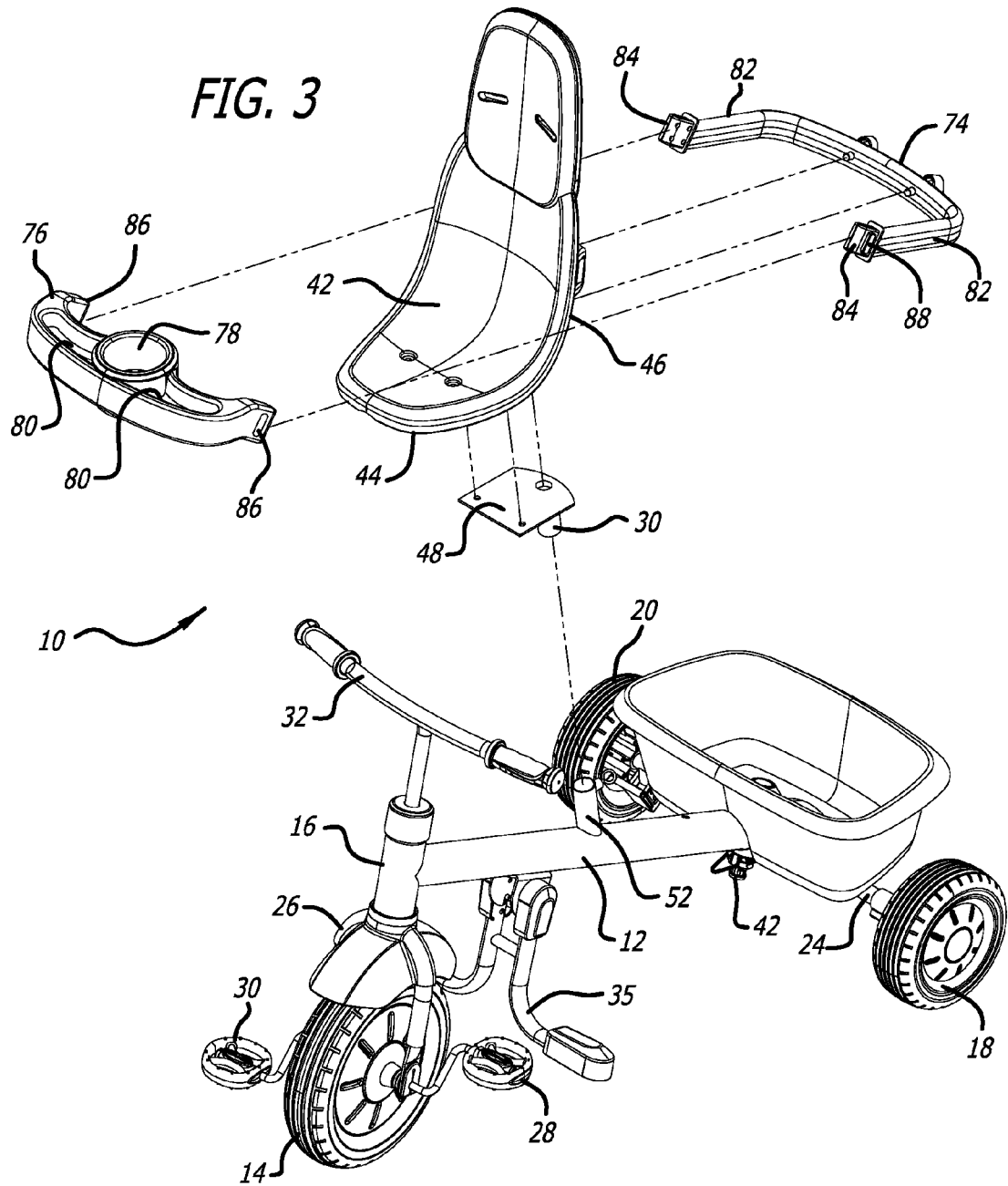
FIG. 3 is an exploded view of the tricycle of FIG. 1 with certain elements removed.
Figure 5:
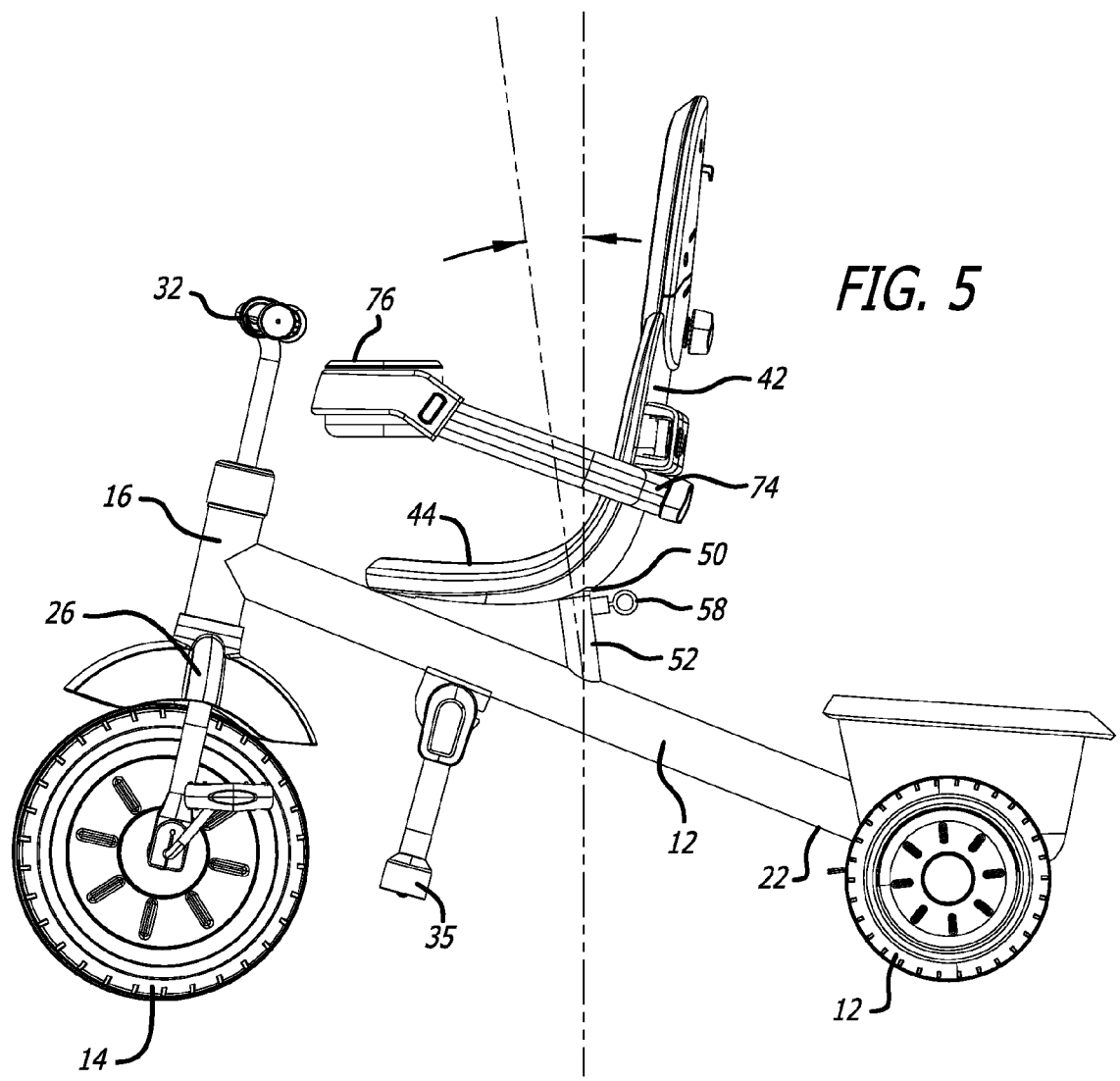
FIG. 5 is a side view of the tricycle of FIG. 1, with certain elements removed.

In one embodiment the tricycle 10 includes a parent handle 34 to assist in pushing the tricycle 10, especially when the tricycle 10 is in the stroller configuration of FIGS. 11-14. In an alternate embodiment the parent handle 34 may be a steer handle that is operatively connected to the front fork 26 such that a rotation of the steer handle about its longitudinal axis rotates the front fork 26 to steer the tricycle 10. This may be accomplished through steering rods, a chain, a belt or another mechanical association between the steer handle 34 and the front fork 26, such as through the frame 12. In this manner, the steer handle can be used by a parent, or other person, to steer the tricycle 10. In one embodiment, the handle 34 is removably connected to the tricycle 10 so that the handle 34 can be removed from the tricycle 10 as shown in FIGS. 3 and 5. The parent handle 34 may include a hand grip portion. In one embodiment, a longitudinal length of the handle 34 may be adjustable to provide a comfortable handle position for different users that may be pushing and/or steering the tricycle 10. For example, when a coupling assembly 36 is unlocked, an upper shaft 38 of the handle 34 may be slid over or into a lower shaft 40 of the handle 34, thereby shortening the overall length of the handle 34.

Figure 4:
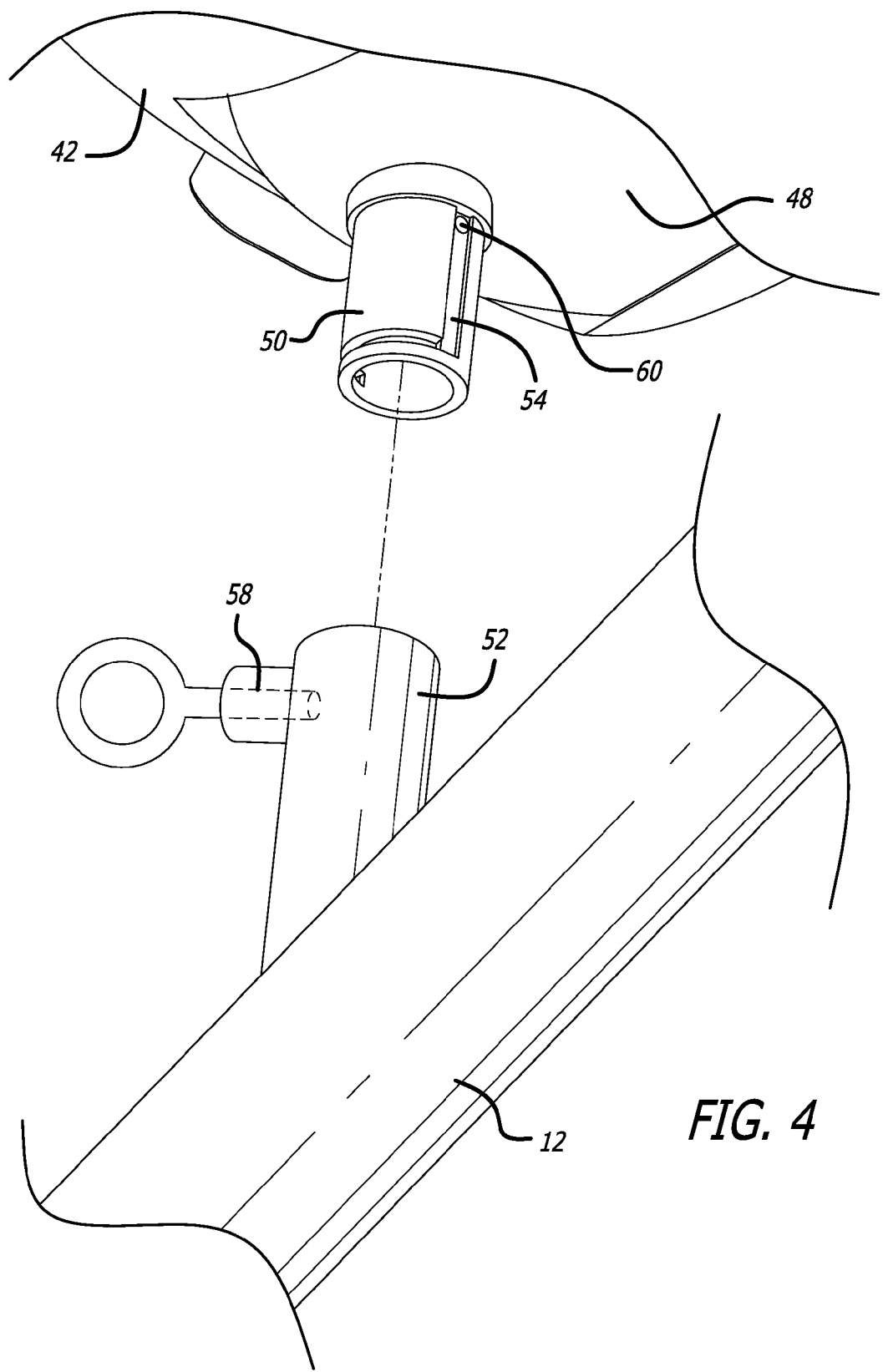
FIG. 4 is a partial exploded view of the seat post engagement of one embodiment of the tricycle of FIG. 1.
Figure 6A:
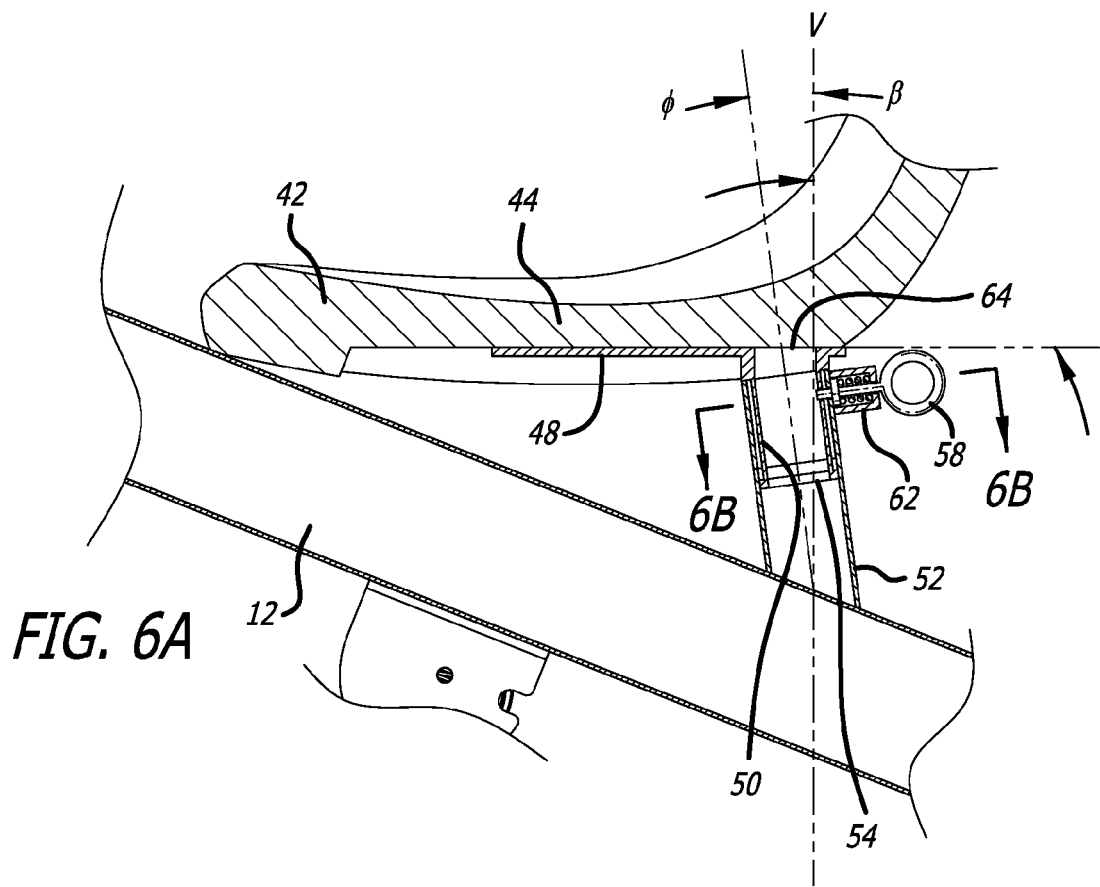
FIG. 6A is a blown up cross-sectional view of a portion of an exemplar engagement between the seat and the tricycle frame.

In one embodiment, a seat 42 is coupled to the frame 12. The seat 42 may include an integrally formed seat base 44 and a seat back 46. Alternatively, the seat 42 may be formed of a separate seat base 44 and seat back 46 that are attached to each other, or mounted separately. The seat 42 may also be supported by a seat bracket 48, as shown in FIGS. 3 and 5-10. In one embodiment the seat bracket 48 is connected to the seat 42, and in an alternate embodiment the seat bracket 48 may be integral with the seat 42. Further, in one embodiment, as shown in FIG. 4, the seat bracket 48 includes a seat post 50 extending therefrom. As shown in FIGS. 5 and 6A, the seat post 50 is received in a seat receiver 52 in the frame 12. In one embodiment the seat receiver 52 is a tube extending from the longitudinal tube of the frame 12, and the seat post 50 is placed within the seat receiver 52 to secure the seat 42 to the frame 12.

Figure 6B:
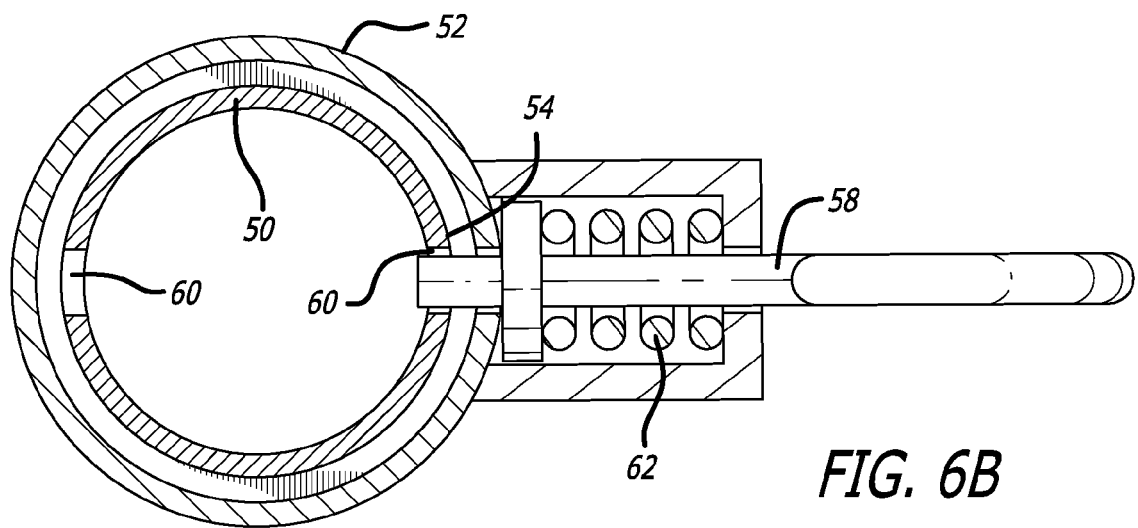
FIG. 6B is a cross-sectional view about line 6B-6B of FIG. 6A.

The seat post 50 may have a stop to prevent the seat post 50 from being unintentionally removed from the seat receiver 52 after they are joined. In one embodiment the stop is a cam receiver 54 in the seat post 50 that receives a cam follower 58 connected to the seat receiver 52. As shown in FIG. 4, the cam receiver 54 may be a slot, groove or track 54 and the cam follower 58 may be a pin 58 (see also FIG. 6B). The seat post 50 may also have a detent 60 to properly position the seat 42 in the forward orientation and to prevent the seat 42 from unintentionally moving from the forward orientation. In one embodiment, as shown in FIG. 6B, the pin 58 is biased with a spring 62 to maintain the pin 58 in engagement with the detent 60 until removed by a user. In an alternate embodiment a screw may provide the function of the pin 58, and a clamp (not shown) may be provided to secure the seat post 50 to the seat receiver 52.

Figure 2:
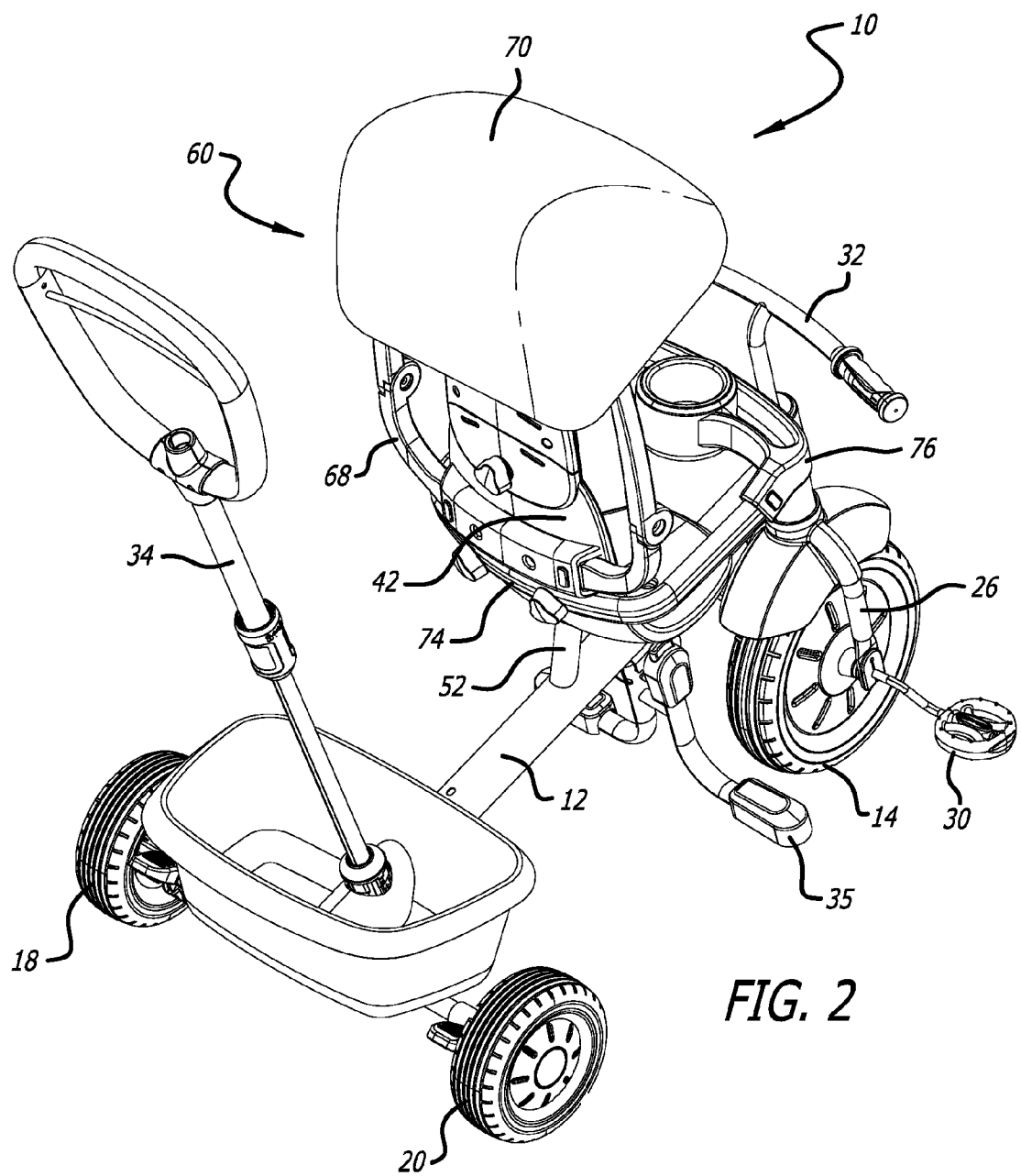
FIG. 2 is a rear-top perspective view of the tricycle of FIG. 1.
Figure 7:
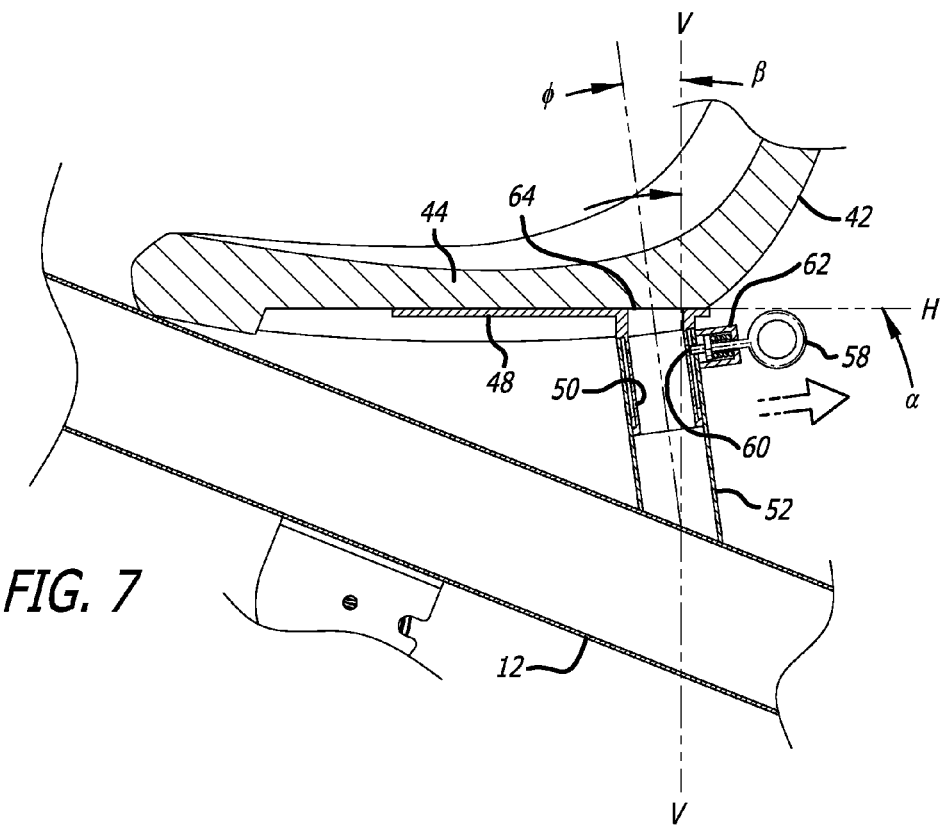
FIG. 7 is a blown up cross-sectional view of a portion of an exemplar engagement between the seat and the tricycle frame, during a transition of the seat from the front facing orientation to the rear facing orientation.
Figure 8:
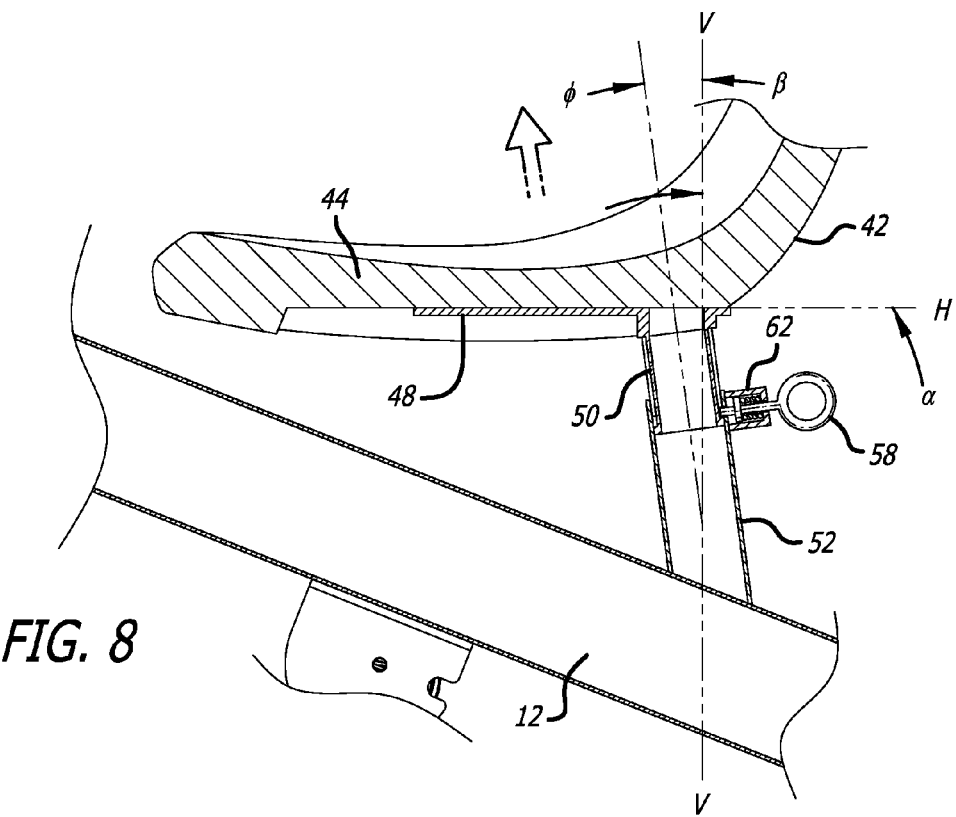
FIG. 8 is a blown up cross-sectional view of a portion of an exemplar engagement between the seat and the tricycle frame, during a transition of the seat from the front facing orientation to the rear facing orientation.
Figure 9:
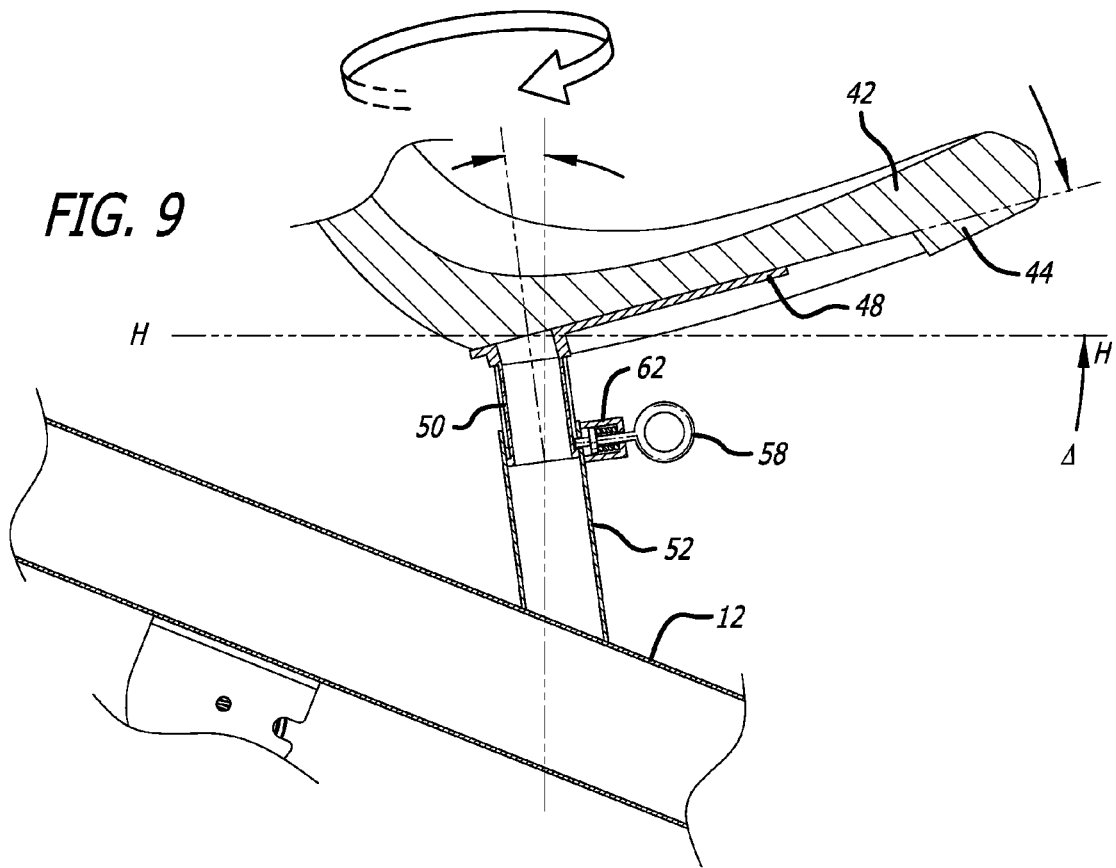
FIG. 9 is a blown up cross-sectional view of a portion of an exemplar engagement between the seat and the tricycle frame, during a transition of the seat from the front facing orientation to the rear facing orientation.
Figure 10:
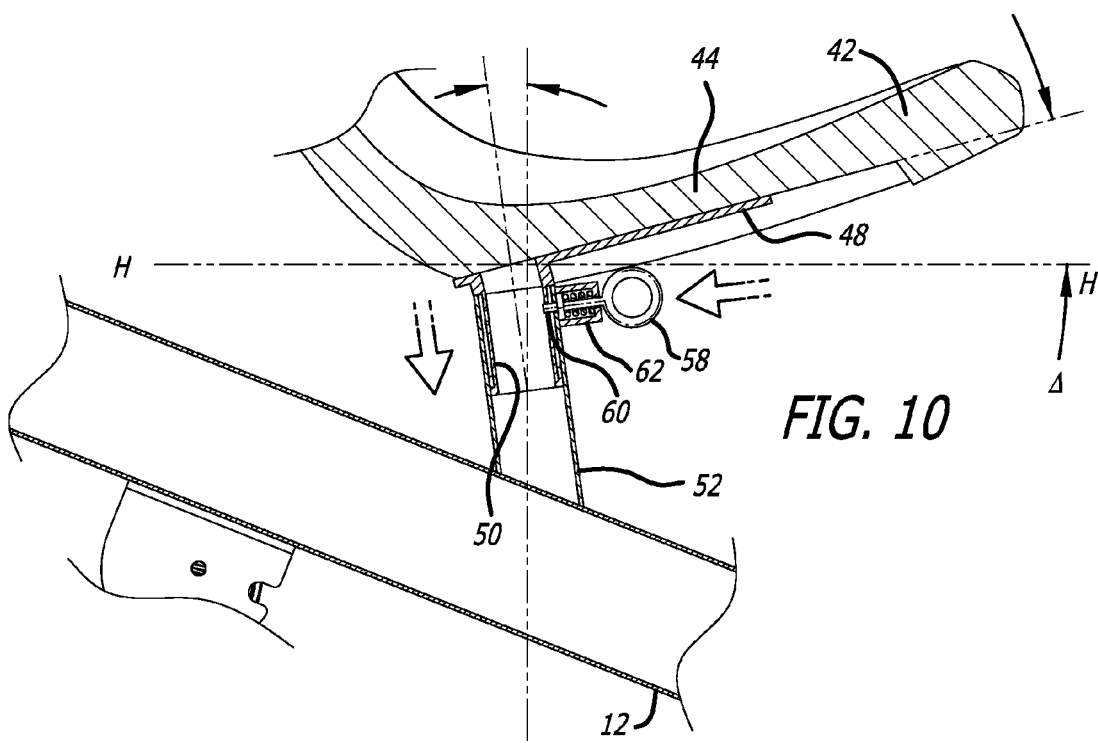
FIG. 10 is a blown up cross-sectional view of a portion of an exemplar engagement between the seat and the tricycle frame, during a transition of the seat from the front facing orientation to the rear facing orientation.
Figure 11:
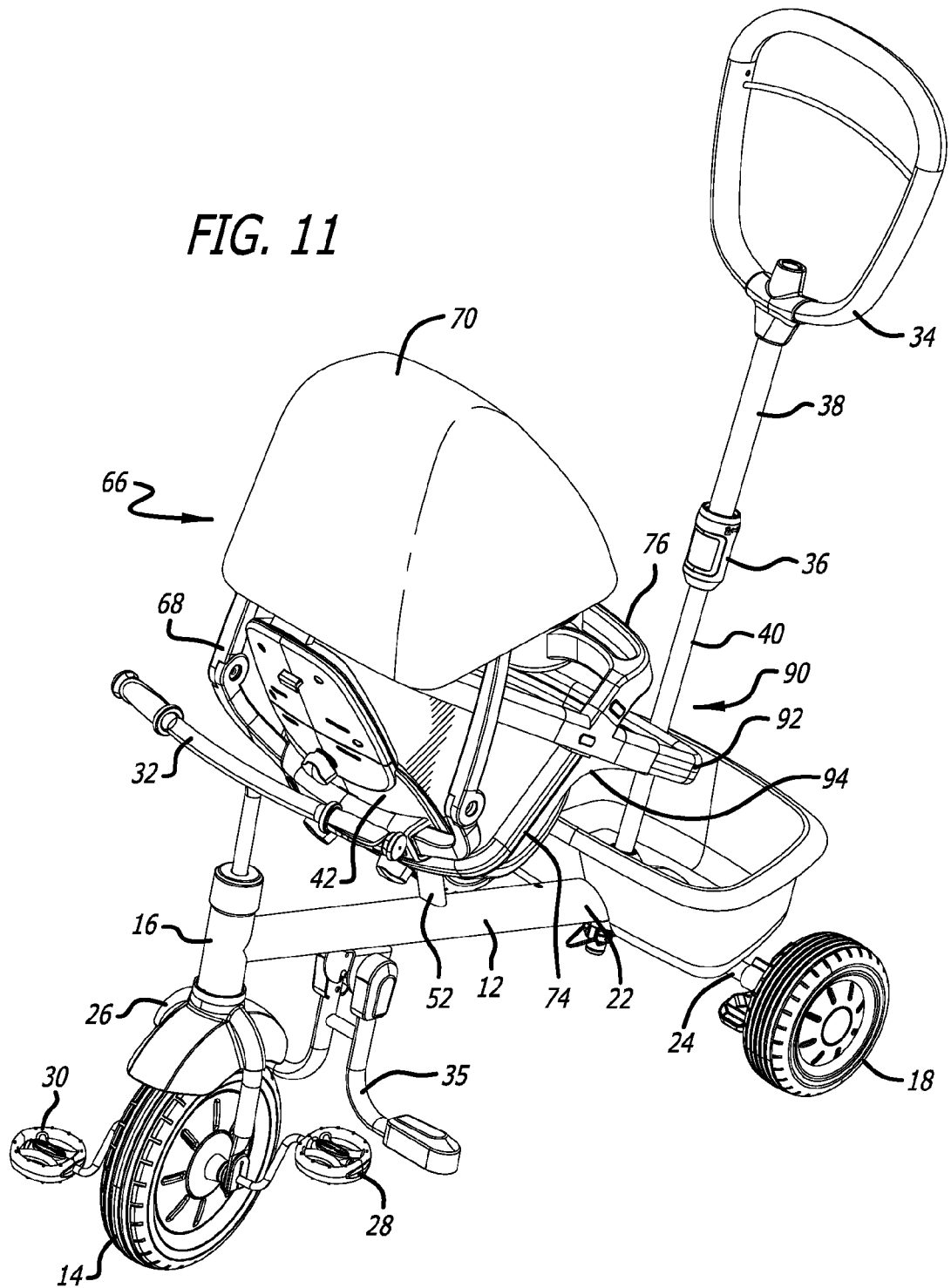
FIG. 11 is a front-top perspective view of a tricycle with a rear facing seat.
Figure 12:
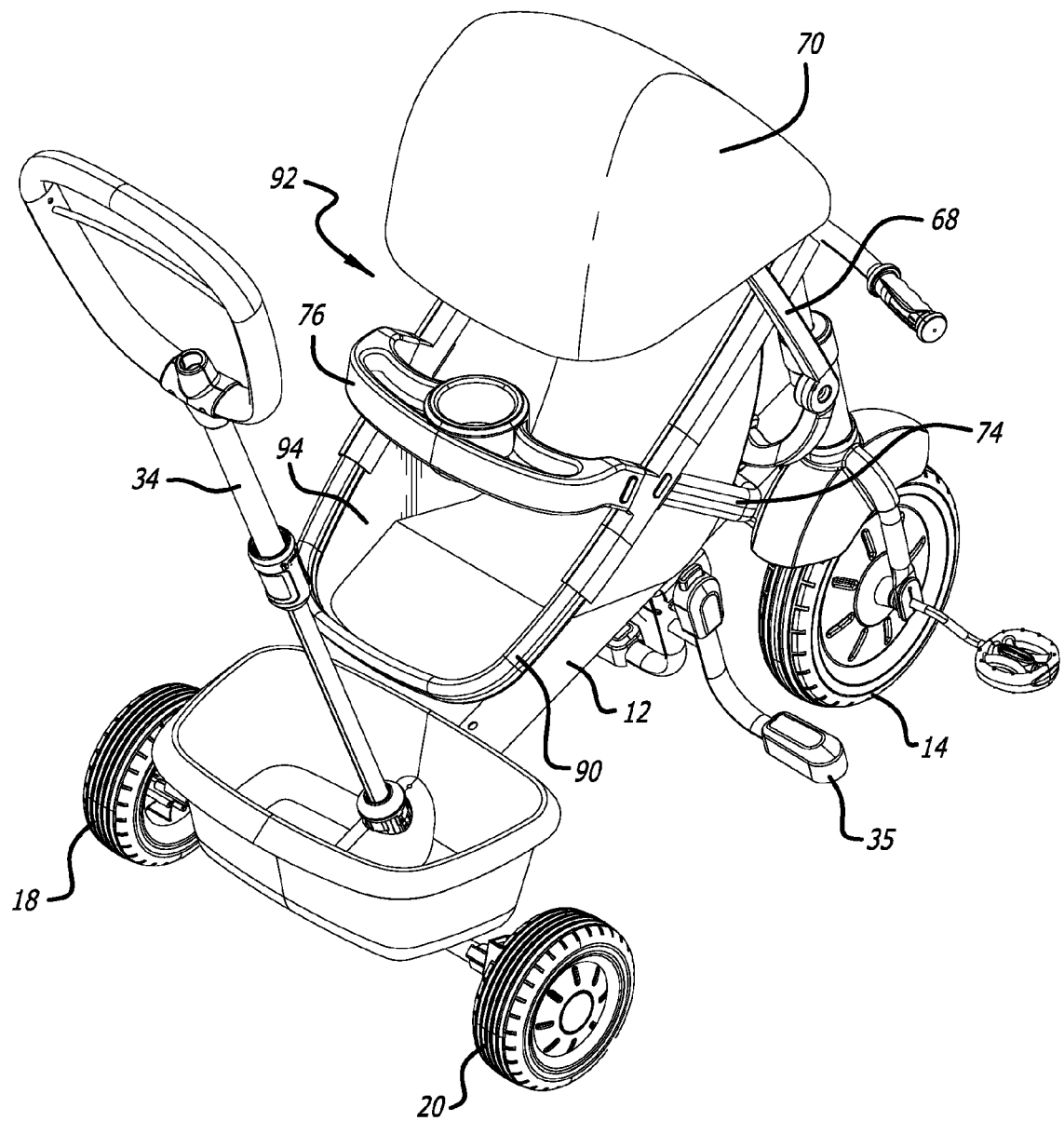
FIG. 12 is a rear-top perspective view of the tricycle of FIG. 11.

As explained above, the seat 42 is positionable between a first or forward facing position as shown in FIGS. 1 and 2, and a second or rear facing position as shown in FIGS. 11 and 12. In one embodiment the track 54 allows the seat 42 to be moved from the forward facing position to the rear facing position without the seat post 50 being removed from the seat receiver 52. The track 54 and detents 60 also assist in maintaining the seat 42 in the proper use orientations of forward facing or rear facing. Specifically, in one embodiment, as shown in FIG. 4, the track 54 is generally U-shaped. Accordingly, to move the seat 42 from the forward facing orientation to the rear facing orientation, the user first pulls the cam follower 58 from the forward facing detent 60 as shown in FIG. 7. When the cam follower 58 is removed from the detent 60 the seat 42 can be raised as shown in FIG. 8, however, in a preferred embodiment the cam follower 58 remains in the cam track 54. The user then rotates the seat 42 approximately 180°, with the cam follower 58 following the bottom portion of the cam track 54, to have the seat 42 face the rear as shown in FIG. 9. Again, the cam follower 58 preferably remains in the track 54. Finally, as shown in FIG. 10, the user pushes the seat 42 back down in the seat receiver 52 by maintaining the cam follower 58 in the track 54 so that the cam follower 58 engages a second rear facing detent 60 (see FIG. 6B) to retain the seat 42 in the rear facing orientation. In an alternate embodiment a spring may be provided within the seat receiver 52 to provide a force to pull the seat 42 down toward the frame 12.

As shown in FIGS. 5 and 6A, in a preferred embodiment, the seat base or seat bottom 44 is preferably positioned substantially horizontally (i.e., approximately parallel to a floor on which the tricycle 10 is positioned) when the seat 42 is positioned in the forward orientation of the tricycle 10. Accordingly, in a preferred embodiment, the angle $\alpha$ between a vertical line (V) and the base of the seat bracket 48 or of the seat base 44 is approximately 90°. Further, in one embodiment the seat receiver 52 is positioned at a forward angle $\phi$ to the vertical line (V). And, in one embodiment the seat post 50 is positioned at a rearward angle $\beta$ to the vertical line (V). In a preferred embodiment the magnitude of the angle $\phi$ is substantially equal to the magnitude of the angle $\beta$. Moreover, in a preferred embodiment the angle $\phi$ is between 5° and 15°, and preferably the angle $\phi$ is approximately 7.5°, and similarly in a preferred embodiment the angle $\beta$ is between 5° and 15°, and preferably the angle $\beta$ is approximately 7.5°. Since the forward angle $\phi$ of the seat receiver 52 is substantially equal to the rear angle $\beta$ of the seat post 50, in a preferred embodiment, the two angles cancel each other out and the seat base 44 is positioned in the substantially horizontal position when forward facing. Conversely, when the seat 44 is rotated to the rear facing orientation as shown in FIG. 10, the angle $\phi$ of the seat receiver 52 and the angle $\beta$ of the seat post 50 are combined to position the seat base 44 at an angle $\Delta$ to the horizontal line (H) equal to the sum of the two angles $\phi$ and $\beta$. In one embodiment where $\phi$ is approximately 7.5° and $\beta$ is approximately 7.5°, the angle $\Delta$ is approximately 15° as shown in FIG. 10. In this orientation the seat 42 is in a reclined orientation at an angle $\Delta$ of approximately 15° when in the rear facing position.

Referring to FIG. 6A, the seat 42 has a pivot point 64 about which the seat 42 pivots or rotates from the forward facing orientation to the rear facing orientation. In one embodiment the pivot point 64 for the seat 42 is offset from the center of the seat bottom 44. Accordingly, in a preferred embodiment the seat 42 is closer to the handlebar assembly 32 when the seat 42 in the front facing position (see FIG. 5) than when the seat 42 is in the rear facing position (see FIG. 14). This allows for additional needed clearance between the seat back 46 and the handlebar assembly 32 in the rear facing orientation of the seat 42 when the seat 42 is reclined back in the preferred embodiment.

Figure 14:
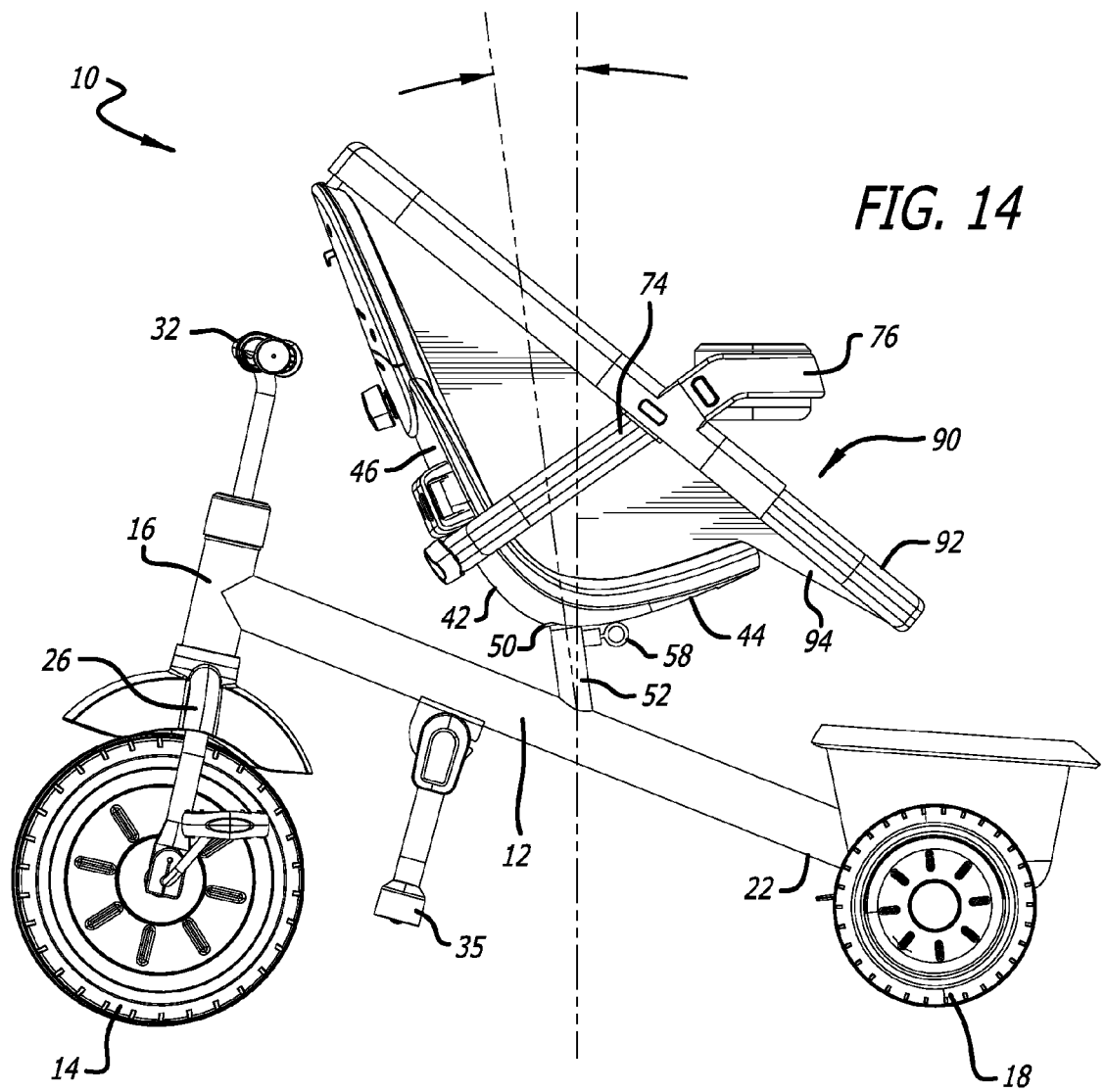
FIG. 14 is a side view of the tricycle of FIG. 11, with certain elements removed.

As shown in FIGS. 1-2 and 11-12, the convertible tricycle 10 may also include a canopy assembly 66 that may include a plurality of canopy arms 68 and a canopy shield 70. The canopy assembly 66 may be pivotable and extendable to a variety of positions, including deployed and retracted positions to shield a child seated on the tricycle 10 from the sun or other weather conditions. In an embodiment, the canopy arms 68 may be removably coupled to the seat back 46, as is best shown in FIGS. 5 and 14 where the canopy assembly 66 is removed from the tricycle 10.

As shown in FIG. 3, the tricycle 10 may also have various forms of an attachment system 72 that may aid in securing a child in the seat 42 or providing storage for possessions. In one embodiment the attachment system 72 may include a retaining hoop 74 and a tray 76. In one embodiment the retaining hoop 74 is removably secured to a rear of the seat 42 so that the overall attachment system 72 can be removed from the tricycle 10. The tray 76 may include a drink holder 78, which may be configured to hold a drinking vessel, and one or more storage compartments 80. The retaining hoop 74 and tray 76 may be integrated into a single part, or may exist as discrete parts that are releasably attached together.

If the tray 76 and retaining hoop 74 are separate components then structure must be provided to secure the two components together. In a preferred embodiment the tray 76 is removably secured to the retaining hoop 74 so that the tray 76 can be joined to the retaining hoop 74 and also removed from the retaining hoop 74 as desired. In one embodiment, each arm 82 of the retaining hoop 74 has a first mating member 84 and each end of the tray 76 has a second mating member 86 which engages the first mating member 84 to removably secure the tray 76 to the retaining hoop 74. In a preferred embodiment the first mating member 84 of the retaining hoop 74 is a male member 84 that engages a female second mating member 86 on the tray 76, however the orientation may be reversed. Additionally, a quick release button 88 may be provided on one of the first or second mating members 84, 86 that allows the hoop 74 and tray 76 to be quickly and easily secured together and disengaged therefrom.

In a preferred embodiment the tray 76 is positioned so that the drink holder 78 and/or storage compartments 80 of the tray 76 are substantially parallel to the ground, i.e., they are horizontally oriented. As shown in FIG. 5, however, the retaining hoop 74 is set at an angle to the horizontal. Accordingly, to have the use portion of the tray 76 positioned substantially parallel to the ground, the first mating member 84 on the retaining hoop 74 and the second mating member 86 on the tray 76 are each set at appropriate angles so that the tray 76 is positioned in the horizontal orientation following connection of the tray 76 to the retaining hoop 74.

Turning now to the embodiment of FIGS. 11-14, the convertible tricycle 10 may include a fabric hoop 90 for use with an infant in the rear facing mode of the tricycle 10 so that the tricycle essentially operates as a stroller. Preferably, however, the same retaining hoop 74 and tray 76 used in the forward facing orientation may also be utilized with the fabric hoop 90. In one embodiment the fabric hoop 90 comprises a hoop 92 and a fabric receiver or other member 94 that forms a receiver to support the child and operate as a buffer between the seat 42 and the child in the rear facing stroller mode of FIGS. 11-14. It is noted that the fabric receiver 94 is not included in the exploded view of FIG. 13.

Figure 13:
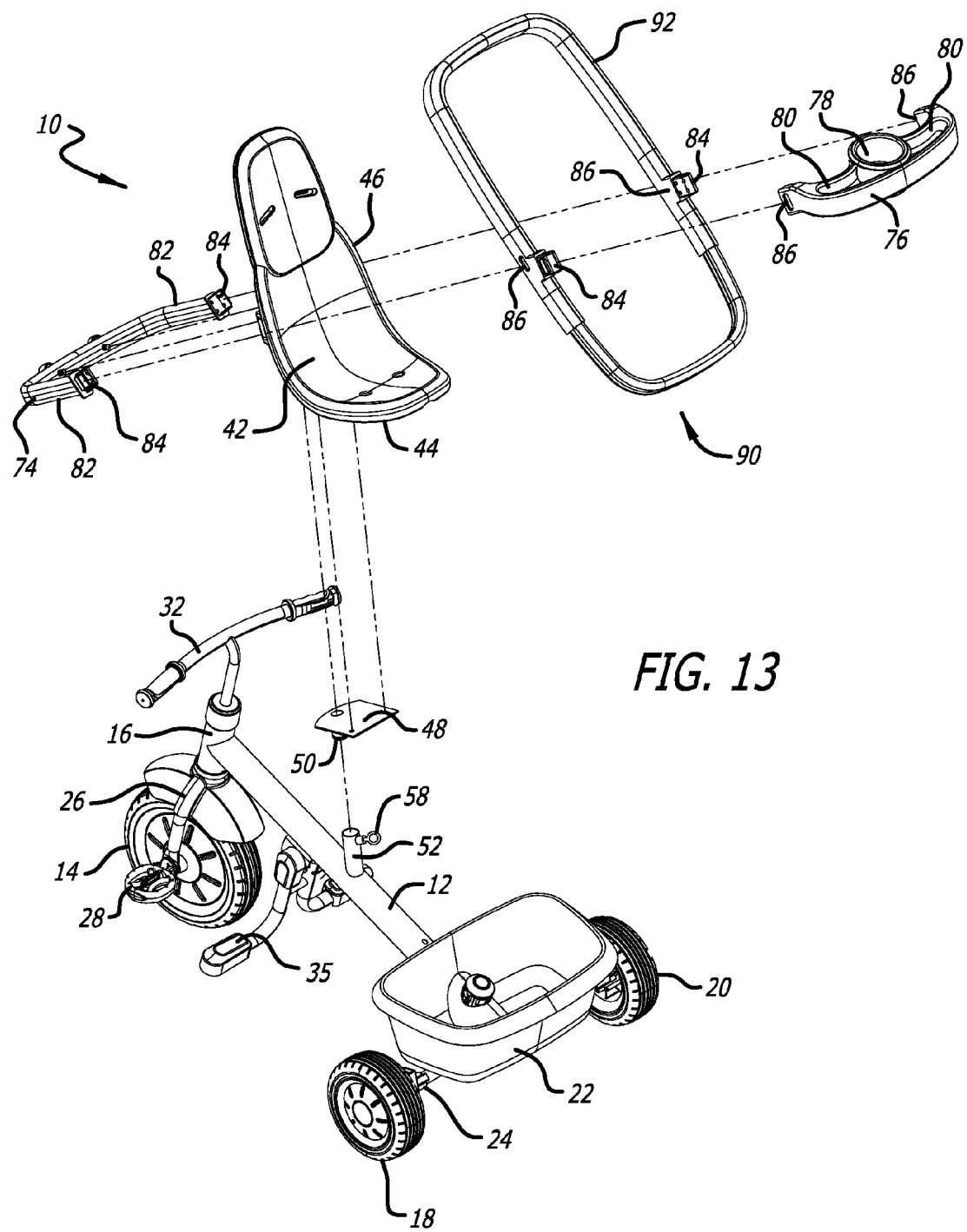
FIG. 13 is an exploded view of the tricycle of FIG. 11 with certain elements removed.
Figure 15:
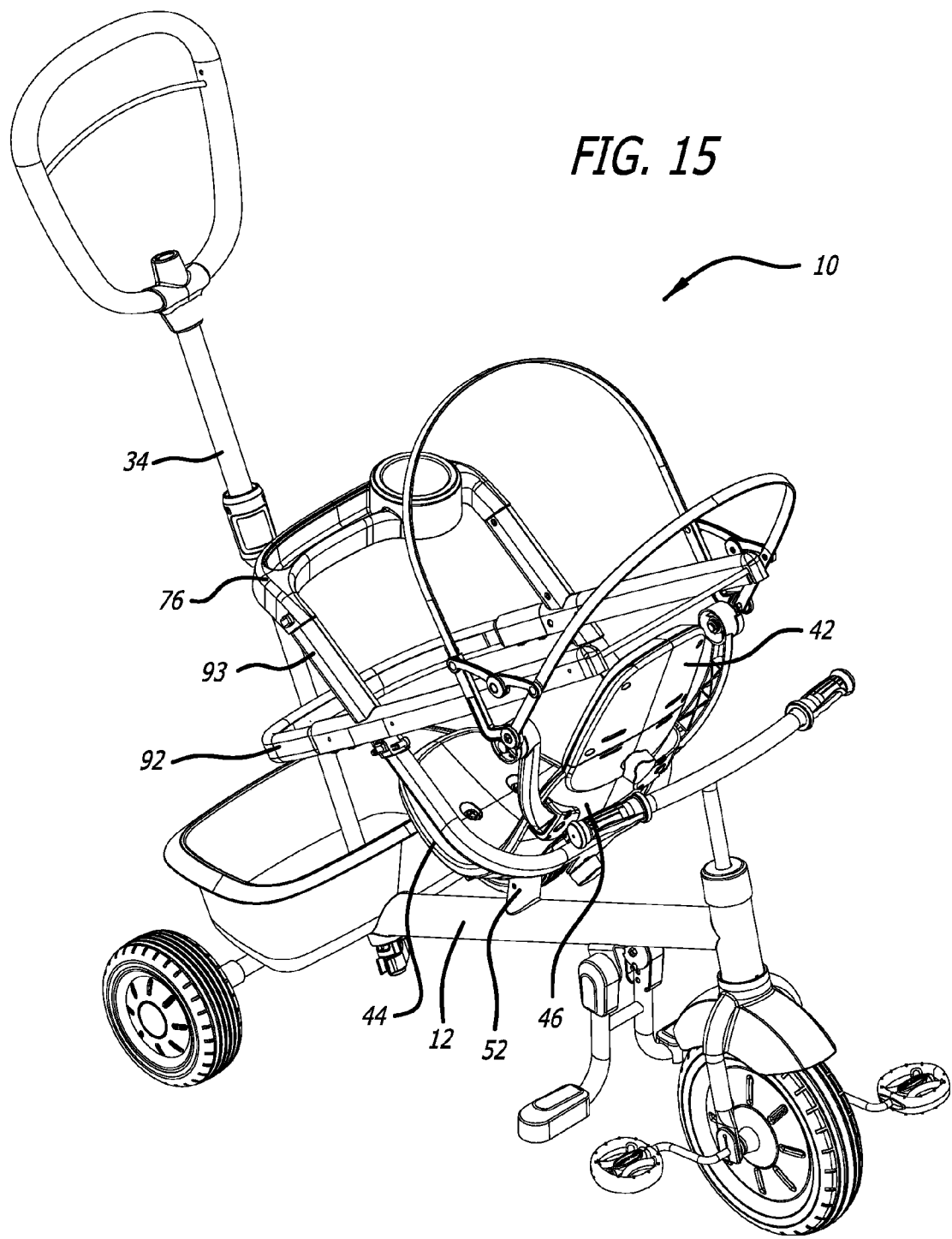
FIG. 15 is a front-top perspective view of a tricycle with a rear facing seat according to another embodiment.
Figure 16:
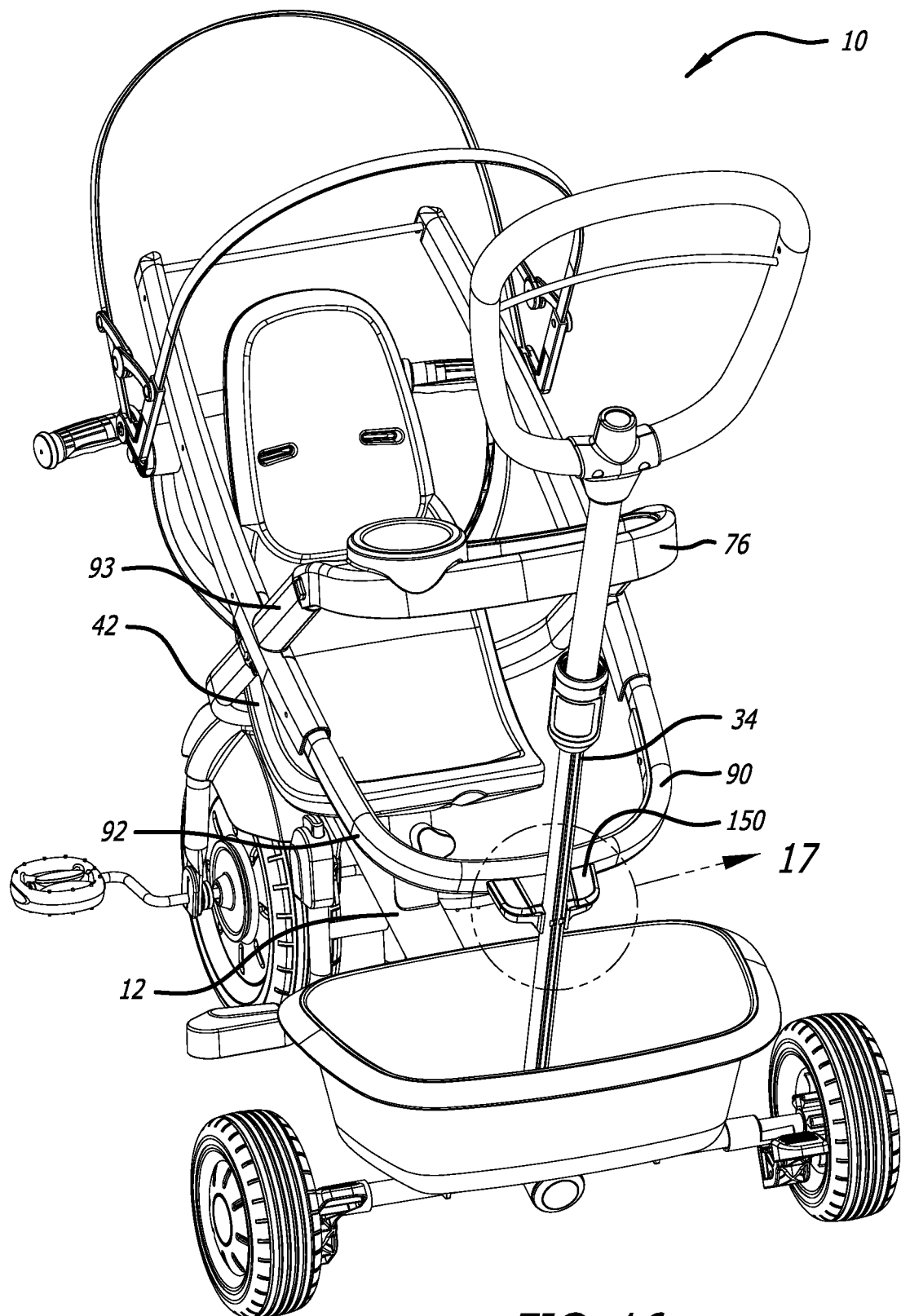
FIG. 16 is a rear-top perspective view of the tricycle of FIG. 15.

In the rear infant facing mode utilizing the fabric hoop 90, in one embodiment the removable retaining hoop 74 is first connected to the seat 42 as shown in FIG. 13. As explained above, in one embodiment each arm 82 of the retaining hoop 74 has a first mating member 84 that is set at a specific angle. In this embodiment rather than having the tray 76 engage the retaining hoop 74, the hoop 92 of the fabric hoop 90 engages the retaining hoop 74. The hoop 92 has corresponding second mating members 86 on one side thereof to allow the hoop 92 to be secured to the retaining hoop 74. The hoop 92 also has first mating members 84 on a second side thereof to allow the tray 76 to be secured to the hoop 92. The orientation of the first mating members on the retaining hoop 74 and second mating members 86 on one side of the hoop 92 correspond to have the fabric hoop 90 set at the proper angle or orientation for a child seated on the reclining seat 42 in the rear facing stroller mode. In one embodiment the fabric hoop 90 is preferably at approximately a 20° to 40° angle with a horizontal reference, and most preferably the fabric hoop 90 is set at approximately a 31° with the horizontal reference. And, the first mating members 84 on the second side of the hoop 92 and the second mating members on the tray 76 correspond so that the tray 76 is positioned in the horizontal orientation following connection of the tray 76 to the hoop 92 of the fabric hoop 90. Each of the connections between the first and second mating members of the fabric hoop 90 system to the retaining hoop 74 and tray 76 may similarly have a quick release mechanism, such as a quick release button for quickly and easily removing each component from the tricycle 10. In an alternate embodiment as shown in FIGS. 15 and 16, the hoop 92 has extensions 93 and the first mating members 84 are provided on the extensions 93 to allow the tray 76 to be secured to the hoop 92, but at a distance from the hoop 92.

Referring to the embodiment of FIGS. 15-24, the ride-on vehicle, herein described as a convertible tricycle 10 for exemplar purposes only, includes an alternate method for rotationally coupling the seat 42 to the frame 12. In this embodiment like components will be described using like nomenclature with the same reference numbers as previously disclosed embodiments. Further, it is understood that different features and aspects of the different embodiments may be incorporated into any of the embodiments disclosed herein.

Figure 18:
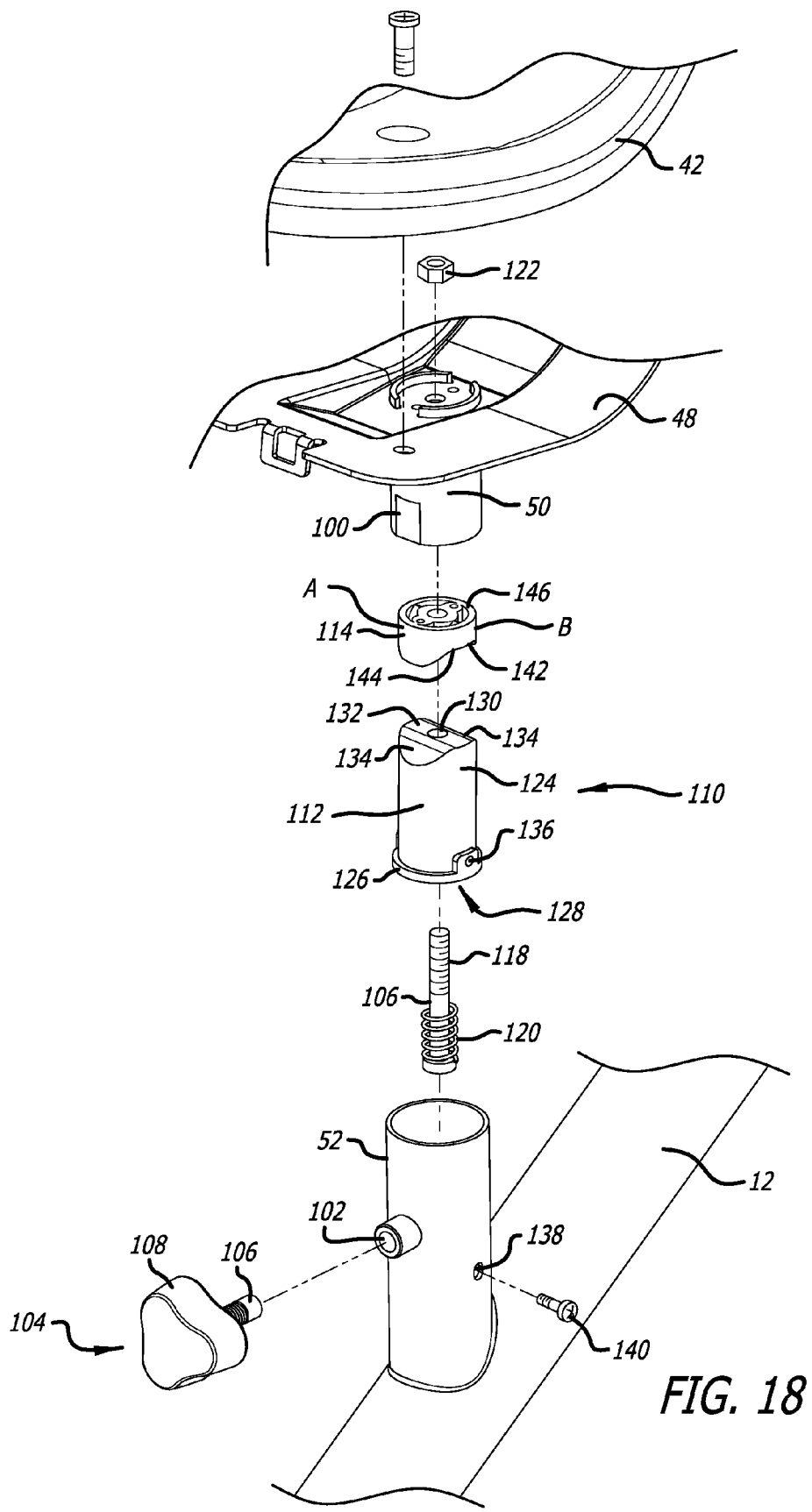
FIG. 18 is a partial exploded view of the seat post engagement of the tricycle of FIG. 15 according to another embodiment.

As best shown in FIGS. 18-24, in one embodiment the seat 42 of the ride-on vehicle 10, again shown for exemplar purposes as a tricycle, is coupled to the frame 12. The seat 42 may include an integrally formed seat base 44 and a seat back 46. Alternatively, the seat 42 may be formed of a separate seat base 44 and seat back 46 that are attached to each other, or mounted separately. The seat 42 may also be supported by a seat bracket 48, as shown in FIGS. 18-24. In one embodiment the seat bracket 48 is connected to the seat 42, and in an alternate embodiment the seat bracket 48 may be integral with the seat 42. Further, in one embodiment, as shown in FIG. 18, the seat 42, and preferably the seat bracket 48 connected to the seat 42, includes a seat post 50 extending therefrom. In one embodiment the seat post 50 is a cylindrical tube. The seat post 50 is received in a seat receiver 52 in the frame 12. In one embodiment the seat receiver 52 is a mating tube extending from the longitudinal tube of the frame 12, and the seat post 50 is placed within the seat receiver 52 to rotationally secure the seat 42 to the frame 12.

The body of the seat post 50 may have a plurality of flats 100 or detents 100 on an outer surface thereof to assist the seat 42 in being appropriately secured and/or positioned in the forward and rearward facing positions of the seat 42. Additionally, the seat receiver 52 may have an aperture 102, which may be threaded, to receive a stopper 104. In one embodiment the stopper 104 comprises a shaft 106, which similarly may be threaded, connected to a knob 108 for moving the shaft 106 in the aperture 102 of the seat receiver 52. The flats/detents 100 in the seat post 50 may be aligned with the aperture 102 so that the stopper 104 engages the flats/detents 100 on the seat post 50 to rotationally retain the seat post 50 in the seat receiver 52 so that the seat 42 cannot be rotated until the stopper 104 is disengaged from the seat post 50. By employing threaded aspects to the shaft 106 and aperture 102, the stopper 104 may be secured and locked in position in the aperture 102. In a preferred embodiment the seat post 50 has two flats 100. The first flat 100 is located on the seat post 50 so that the seat 42 is orientated in the forward facing position when the first flat 100 is aligned with the aperture 102 and engaged by the stopper 104, and the second flat 100 is located approximately 180° from the first flat 100 on the seat post 50 so that the seat 42 is orientated in the rear facing position when the second flat 100 is aligned with the aperture 102 and engaged by the stopper 104. The flats may be referred to as detent positions.

In one embodiment, a separate clamp post 110 is provided and is preferably connected to and extends distal the seat 42, and in a preferred embodiment the clamp post 110 is connected to and extends distal the seat bracket 48. Further, in a preferred embodiment the clamp post 110 is provided inside the cavity of the seat post 50. Referring to FIG. 18, in one embodiment the clamp post 110 comprises a base member 112, a swivel plate 114, and a spring loaded connector 116 joining the swivel plate 114 to the base member 112. As shown in FIG. 18, in one embodiment the spring loaded connector 116 comprises a fastener 118, such as a bolt, and a compression spring 120. A second fastener 122, such as a nut, is provided on an opposing side of the seat bracket 48 to connect the clamp post 110 with the spring loaded connector 116 to the seat 42.

As best shown in FIG. 18, the base member 112 of the clamp post 110 comprises a cylindrical body 124 having an annular shoulder 126 at a base of the cylindrical body 124, an internal cavity 128 extending into the cylindrical body 124 from the base of the cylindrical body 124, an aperture 130 extending longitudinally through the body 124, and a top surface 132 having multiple cam surfaces 134. In one embodiment the cam surfaces 134 form a generally convex top surface 132 for the base member 112. In a preferred embodiment the cam surfaces 134 on the top surface 132 of the base member 112 are symmetrical about a radial centerline of the base member 112. In a preferred embodiment, one or more apertures 136 are provided in the annular shoulder 126 of the base member 112 of the clamp post 110. The apertures 136 mate with apertures 138 in the seat receiver 52 in the frame 12. A fastener 140 such as a set screw, bolt, or other mating member is inserted through the apertures 138 in the seat receiver 52 and connect with the aperture 136 in the base member 112 to secure the base member 112 in place in the receiver 52.

In one embodiment, the swivel plate 114 comprises a component with a cam surfaces 142 on the lower surface 144 that mate with the cam surfaces 134 on the top surface 132 of the base member 112. And, in a preferred embodiment where the top surface 132 of the base member 112 has a generally convex shape, the mating lower surface 144 of the swivel plate 114 has a generally concave shape. Further, in a preferred embodiment the cam surfaces 142 on the lower surface 144 of the swivel plate 114 are symmetrical about a radial centerline of the swivel plate 114, thus the first and second detent positions are rotational positioned approximately 180° apart. As shown in FIG. 18, the swivel plate 114 is preferably secured to the seat 42, and most preferably the swivel plate 114 is preferably secured to a lower surface of the seat bracket 48. Referring to FIG. 18, in one embodiment two fasteners are used to secure the top surface 146 of the swivel plate 114 to the lower surface of the seat bracket 48. Accordingly, as the seat 42 rotates from the forward facing position to the rear facing position, and vice versa, the swivel plate 114 of the clamp post 110 also rotates with the seat 42. And, because the cam surfaces 142 on the lower surface 144 of the swivel plate 114 and the cam surfaces 134 on the top surface 132 of the base member 112 are symmetrical about a radial centerline of the clamp post 110, this allows for two detent positions of the swivel plate 114 (and thus just two positions for the seat 42) with respect to the base member 112, and wherein the two detent positions are approximately 180° apart from each other. In the first detent position of the swivel plate 114 with respect to the base member 112 the seat 42 will be forward facing, and in the second detent position that is 180° rotated from the first position, the seat 42 will be rear facing.

Because the clamp post 110 is secured to the seat 42 at one end of the clamp post 110 (i.e., the swivel plate 114), and because the clamp post 110 is also secured to the frame receiver 52 at the other end of the clamp post 110 (i.e., the base member 112), when the clamp post 110 is secured in the receiver 52 the seat 42 is correspondingly secured in the receiver 52 and cannot be lifted out of the receiver 52. However, because the swivel plate 114 of the clamp post 110 is secured to the base member 112 of the clamp post 110 with a spring loaded connector 116, when a force is applied to the seat 42 to lift the seat 42 up and out of the receiver 52, the seat 42 and swivel plate 114 can be partially disconnected from the base member 112 of the clamp post 110 to allow the seat 42 and swivel plate 114 to rotate within the receiver 52. When the lifting force on the seat 42 is removed, the compression spring 120 around the connector 116 will operate to pull the seat 42 and swivel plate 114 back toward the base member 112 to properly seat the seat 42 in the receiver 52. As shown in FIG. 18, the clamp post 110 allows for two orientations of the swivel plate 114 with respect to the base member 112—a forward facing orientation of the seat 42 and a rear facing orientation of the seat 42.

Figure 19:
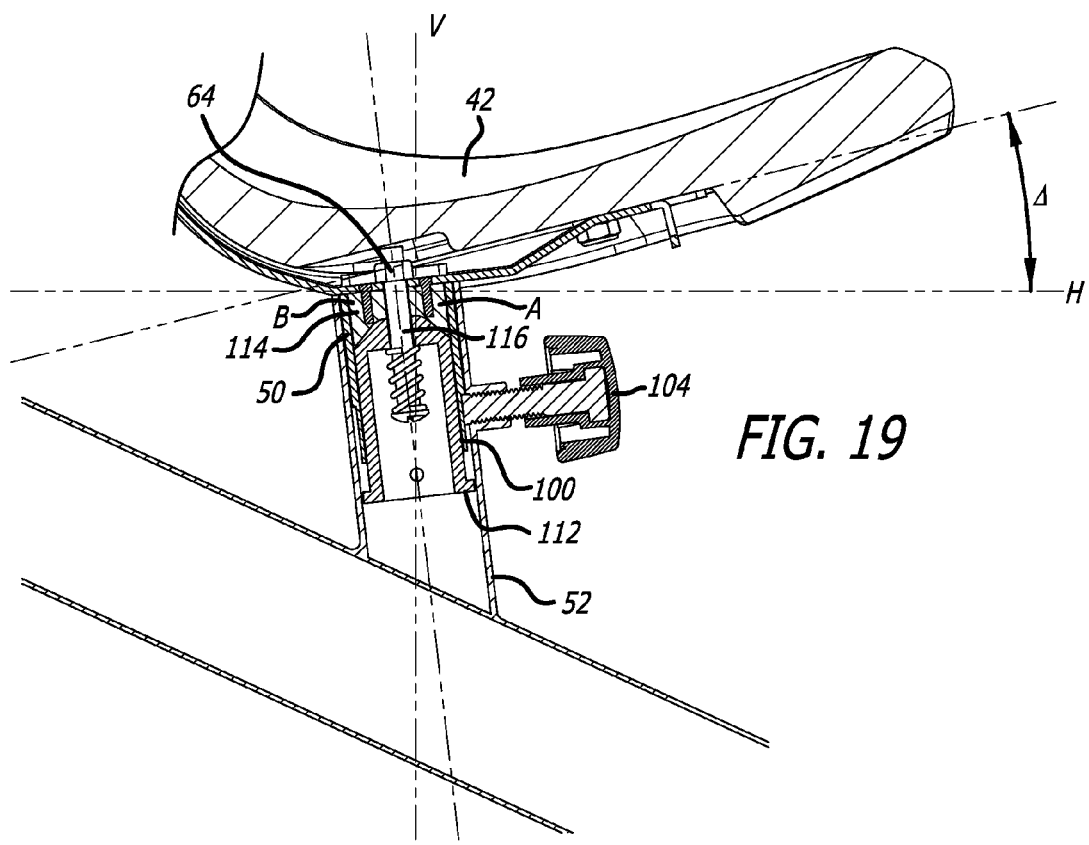
FIG. 19 is a blown up cross-sectional view of a portion of another exemplar engagement between the seat and the tricycle frame of the tricycle of FIG. 15, during a transition of the seat from the rear facing orientation to the front facing orientation.
Figure 24:
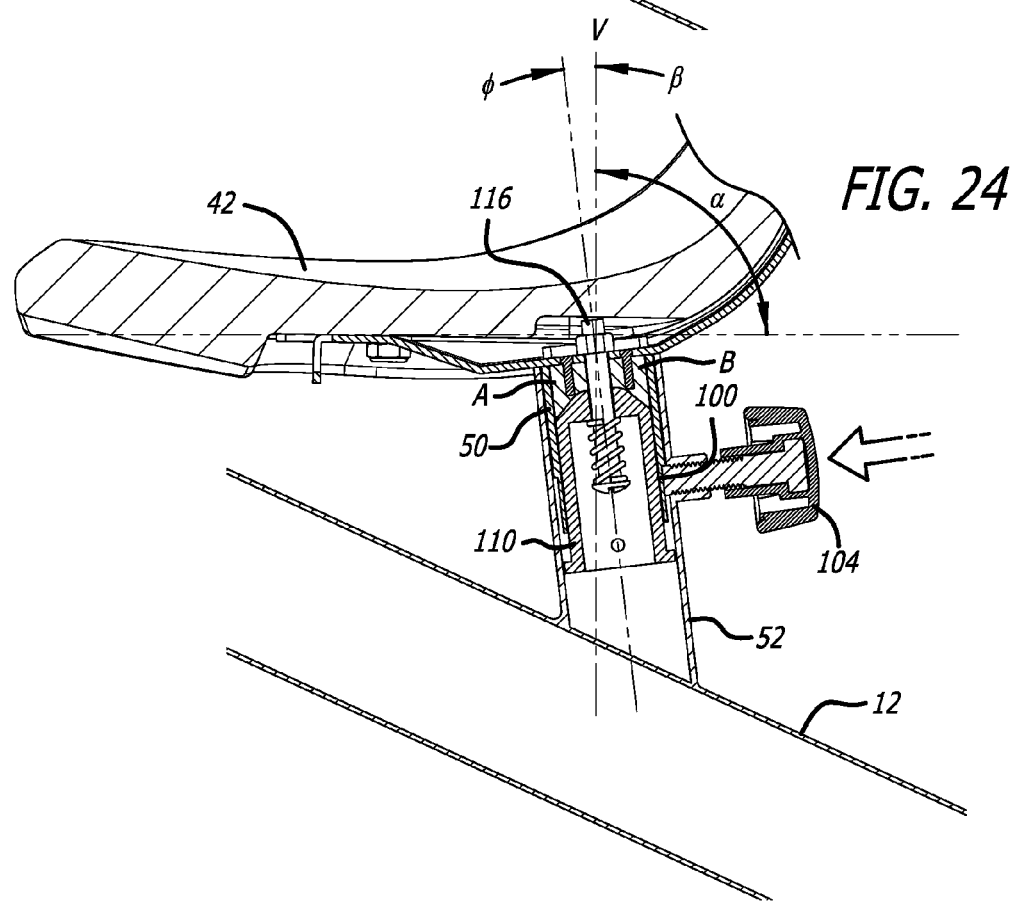
FIG. 24 is a blown up cross-sectional view of a portion of another exemplar engagement between the seat and the tricycle frame of the tricycle of FIG. 15, during a transition of the seat from the rear facing orientation to the front facing orientation.

As explained above, the seat 42 is positionable between a first or forward facing position as shown in FIG. 24, and a second or rear facing position as shown in FIGS. 15, 16 and 19. In one embodiment the cammed relationship of the base member 112 and the swivel plate 114, combined with the spring loaded connector 116 that joins the base member 112 and swivel plate 114 together, as well as the base member 112 being fixed inside the seat receiver 52, allows the seat 42 to be moved from the forward facing position to the rear facing position without the seat post 50 being fully removed from the seat receiver 52. The mating cam surfaces 134 and 142 also assist in maintaining the seat 42 in the proper use orientations of forward facing or rear facing.

Figure 20:
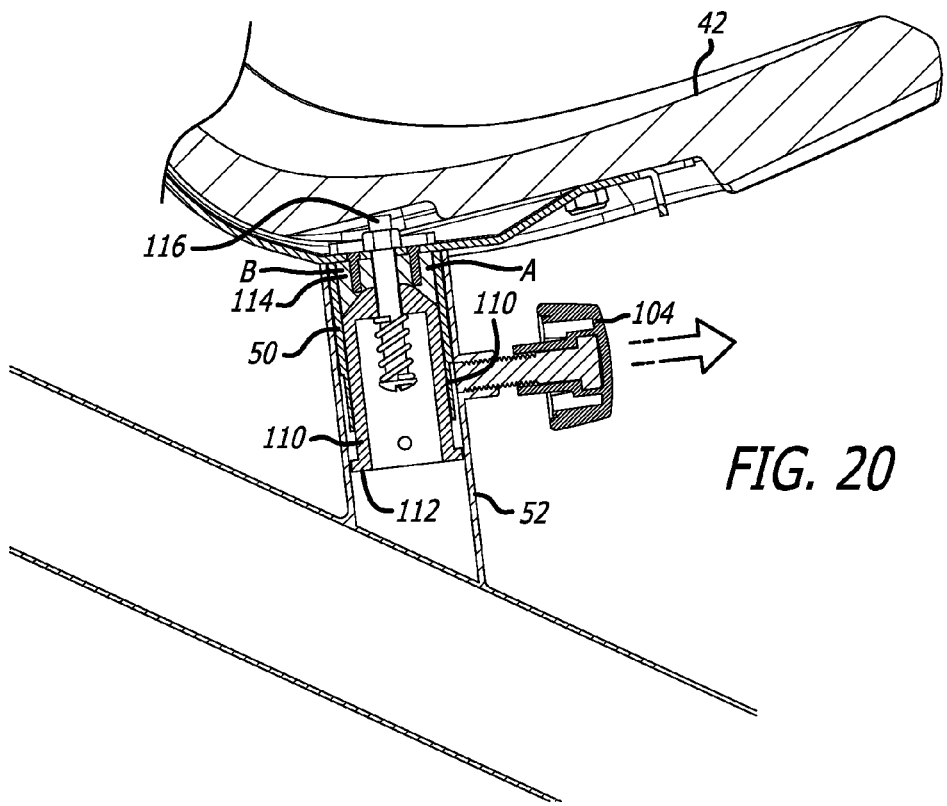
FIG. 20 is a blown up cross-sectional view of a portion of another exemplar engagement between the seat and the tricycle frame of the tricycle of FIG. 15, during a transition of the seat from the rear facing orientation to the front facing orientation.
Figure 21:
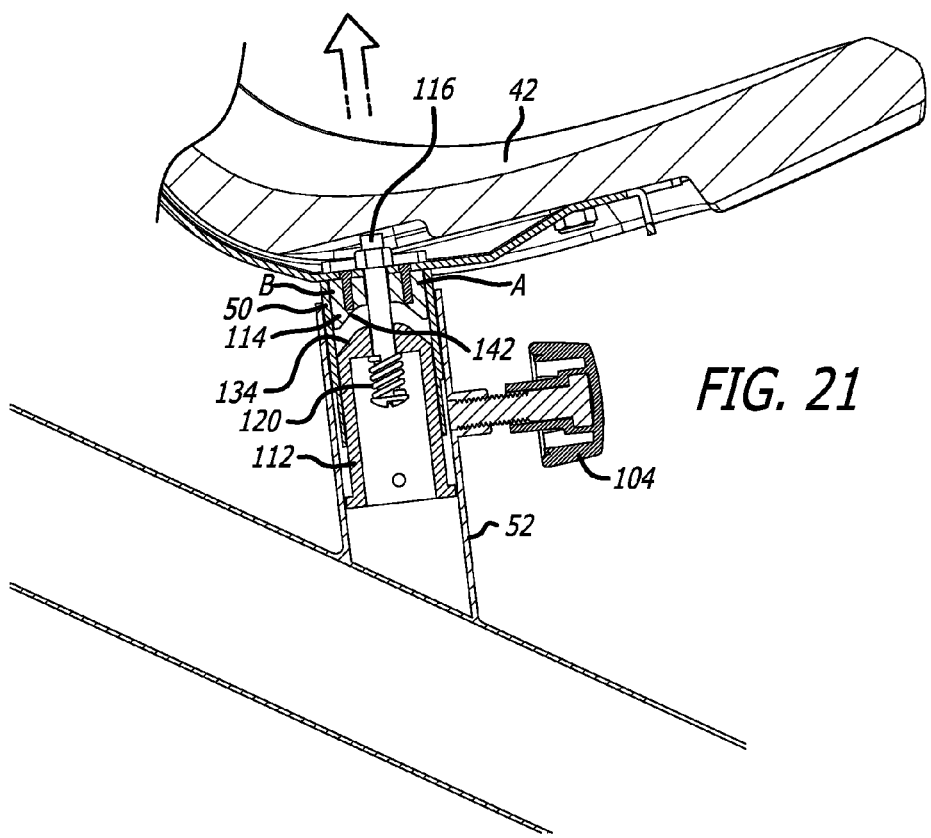
FIG. 21 is a blown up cross-sectional view of a portion of another exemplar engagement between the seat and the tricycle frame of the tricycle of FIG. 15, during a transition of the seat from the rear facing orientation to the front facing orientation.
Figure 22:
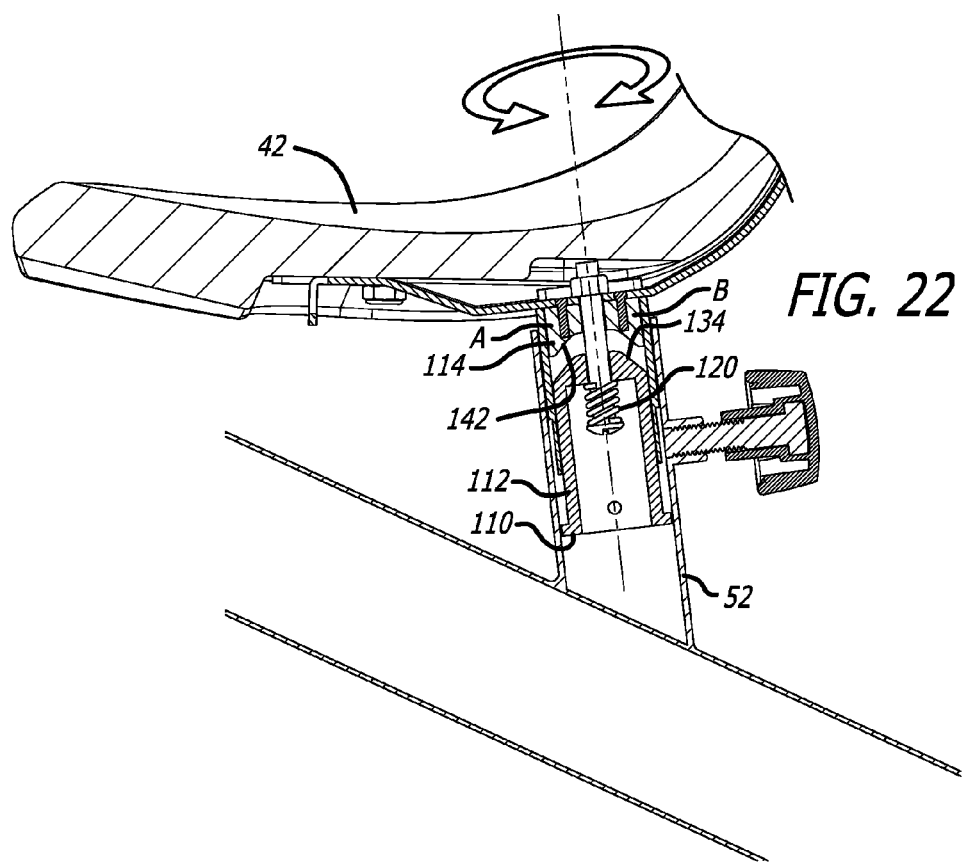
FIG. 22 is a blown up cross-sectional view of a portion of another exemplar engagement between the seat and the tricycle frame of the tricycle of FIG. 15, during a transition of the seat from the rear facing orientation to the front facing orientation.
Figure 23:
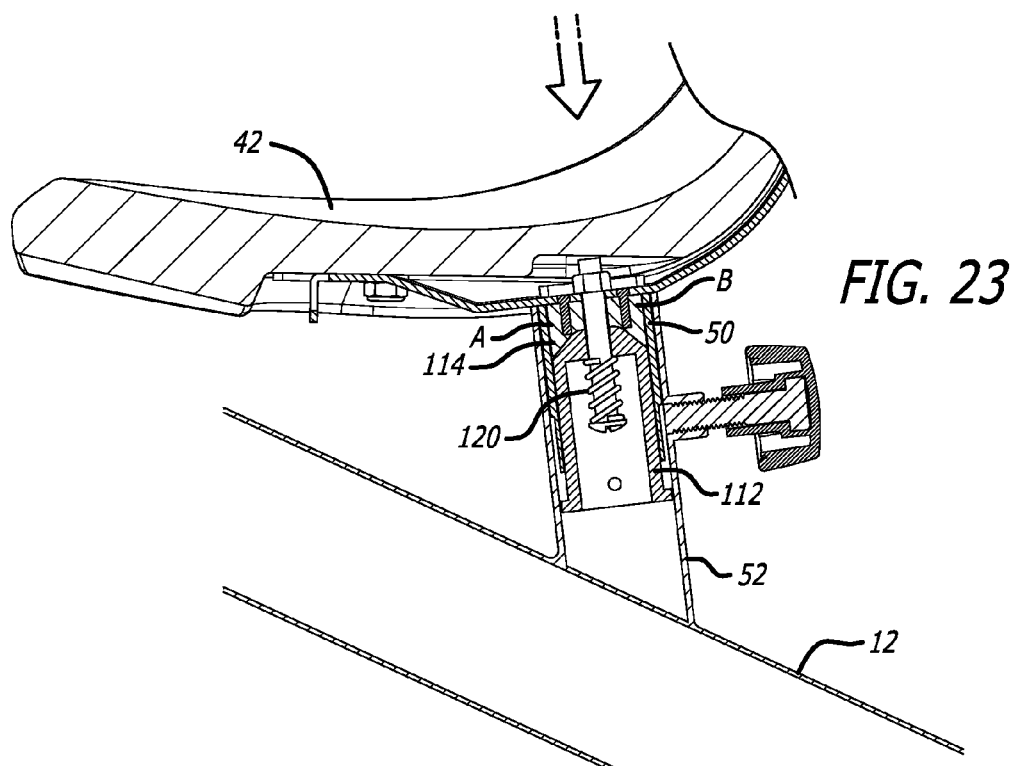
FIG. 23 is a blown up cross-sectional view of a portion of another exemplar engagement between the seat and the tricycle frame of the tricycle of FIG. 15, during a transition of the seat from the rear facing orientation to the front facing orientation.

Referring to FIGS. 19-24, to convert the seat 42 from rear facing to forward facing the following procedure is followed. First, as shown in FIG. 20 the stopper 104 is removed from engagement with the flat 100 on the seat post 50. This generally occurs by rotating the knob 108 to slightly unscrew the stopper 104 and disengage the shaft 106 of the stopper 104 from the flat 100 in the seat post 50. Next, as shown in FIG. 21, the seat 42 is lifted vertically compressing spring 120. Prior to the seat being lifted vertically the cam surfaces of the swivel plate and the base member are known to be engaged in the first detent position. As shown in FIG. 21, the base member 112 of the clamp post 100 remains fixed in position to the interior of the receiver 52, but the swivel plate 114 is lifted off of the base member 112 but still remains operatively connected to the base member 112 through the spring loaded connector 116. Next, as shown in FIG. 22, the seat 42 together with the swivel plate 114 that is connected to the seat 42 is rotated approximately 180°. In the next step, as shown in FIG. 23, the seat 42 is pushed back into the receiver 52 so that the cam surfaces 142 of the swivel plate 114 engages the mating cam surfaces 134 of the base member 112 in a second orientation between the base member 112 and swivel plate 114—this position is the second detent position. Additionally, when the lifting force on the seat 42 is removed as in FIG. 23, the compression spring 120 around the connector 116 will operate to pull the seat 42 and swivel plate 114 back toward the base member 112 to properly seat the seat 42 in the receiver 52. Finally, as shown in FIG. 24, the stopper 104 can be adjusted to re-engage the flat 100 on the seat post 50, but the stopper 104 will be engaging a different flat 100 than was engaged in the rear facing orientation of the seat 42.

As shown in FIG. 24, in a preferred embodiment, the seat base or seat bottom 44 is preferably positioned substantially horizontally (i.e., approximately parallel to a floor on which the tricycle 10 is positioned) when the seat 42 is positioned in the forward orientation of the tricycle 10. Accordingly, in a preferred embodiment, the angle $\alpha$ between a vertical line (V) and the base of the seat bracket 48 or of the seat base 44 is approximately 90°. Further, in one embodiment the seat receiver 52 is positioned at a forward acute angle $\phi$ to the vertical line (V). And, in one embodiment the seat post 50 is positioned at a rearward acute angle $\beta$ to the vertical line (V). In a preferred embodiment the magnitude of the acute angle $\phi$ is substantially equal to the magnitude of the acute angle $\beta$. Moreover, in a preferred embodiment the angle $\phi$ is between 5° and 15°, and preferably the angle $\phi$ is approximately 7.5°, and similarly in a preferred embodiment the angle $\beta$ is between 5° and 15°, and preferably the angle $\beta$ is approximately 7.5°. Since the forward angle $\phi$ of the seat receiver 52 is substantially equal to the rear angle $\beta$ of the seat post 50, in a preferred embodiment, the two angles cancel each other out and the seat base 44 is positioned in the substantially horizontal position when forward facing. Conversely, when the seat 44 is rotated to the rear facing orientation as shown in FIG. 19, the angle $\phi$ of the seat receiver 52 and the angle $\beta$ of the seat post 50 are combined to position the seat base 44 at an angle $\Delta$ to the horizontal line (H) equal to the sum of the two angles $\phi$ and $\beta$. In one embodiment where $\phi$ is approximately 7.5° and $\beta$ is approximately 7.5°, the angle $\Delta$ is approximately 15° as shown in FIG. 19. In this orientation the seat 42 is in a reclined orientation at an angle $\Delta$ of approximately 15° when in the rear facing position.

Accordingly, rotation of the seat within the receiver from a rear facing orientation to the forward facing orientation automatically causes the base portion of the seat to be positioned in the generally horizontal orientation. Further, a relationship of the mating member and receiver prevents the base portion of the seat from being positioned in another orientation with respect to a horizontal axis when the seat is forward facing. Similarly, rotation of the seat within the receiver from a forward facing orientation to the rear facing orientation automatically causes the base portion of the seat to be tilted at the acute angle greater than 0° with respect to the horizontal axis. And, a relationship of the post and receiver prevents the base portion of the seat from being positioned in another orientation with respect to the horizontal axis when the seat is rear facing.

Referring to FIG. 19, the seat 42 has a pivot point 64 about which the seat 42 pivots or rotates from the forward facing orientation to the rear facing orientation. In one embodiment the pivot point 64 for the seat 42 is offset from the center of the seat bottom 44. Accordingly, in a preferred embodiment the seat 42 is closer to the handlebar assembly 32 when the seat 42 in the front facing position than when the seat 42 is in the rear facing position. This allows for additional needed clearance between the seat back 46 and the handlebar assembly 32 in the rear facing orientation of the seat 42 when the seat 42 is reclined back in the preferred embodiment.

Figure 17:
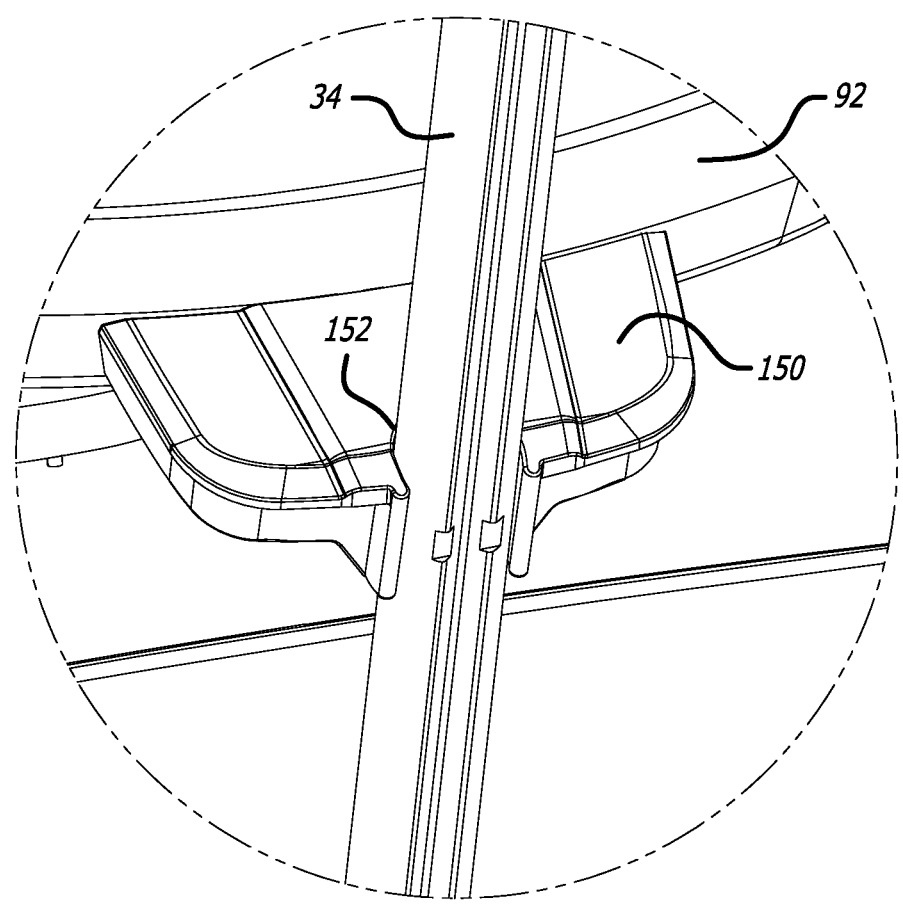
FIG. 17 is an enlarged view of a connection member of the tricycle of FIG. 15.

Referring to FIGS. 16 and 17, the hoop 92 may be provided with an extension 150 to engage the parent assist handle 34. The extension 150 on the hoop 92 that engages the parent assist handle 34 operates to provide additional rigidity to the hoop 92. In one embodiment the opening 152 in the extension 150 that mates with the parent assist handle 34 provides a pressure fit to sure the handle 34 to the extension. In an alternate embodiment, protrusions may be provided on the parent assist handle 34 and mating apertures may be provided in the opening 152 of the extension 150 to properly locate and affix the handle 34 to the extension 150.

Several alternative embodiments and examples have been described and illustrated herein. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. Additionally, the terms "first," "second," "third," and "fourth" as used herein are intended for illustrative purposes only and do not limit the embodiments in any way. Further, the term "plurality" as used herein indicates any number greater than one, either disjunctively or conjunctively, as necessary, up to an infinite number. Additionally, the term "having" as used herein in both the disclosure and claims, is utilized in an open-ended manner.

It will be understood that the disclosed embodiments may be embodied in other specific forms without departing from the spirit or central characteristics thereof. The present examples and embodiments, therefore, are to be considered in all respects as illustrative and not restrictive, and the disclosed embodiments are not to be limited to the details given herein. Accordingly, while the specific embodiments have been illustrated and described, numerous modifications come to mind without significantly departing from the spirit of the disclosure and the scope of protection is only limited by the scope of the accompanying Claims.

What is claimed is:

1. A ride-on vehicle, comprising:
   a frame;
   a plurality of wheels supporting the frame;
   a receiver extending from the frame at a first acute angle greater than 0° with respect to a vertical axis; and,
   a seat rotatedly connected to the frame, the seat having a post extending from a bottom of the seat at a second acute angle greater than 0° with respect to the vertical axis, wherein the post is rotatedly received by the receiver of the frame, wherein one of the receiver and post have a first detent position for the seat and a second detent position for the seat, the second detent position being rotationally positioned approximately 180° from the first detent position, wherein the seat is forward facing in the first detent position, wherein the seat is rear facing in the second detent position, wherein a relationship between the post and the receiver causes the bottom of the seat to be positioned in a generally horizontal orientation when the seat is positioned in the first detent and the bottom of the seat to be positioned at an acute angle greater than 0° with respect to a horizontal axis when the seat is positioned in the second detent.

2. The ride-on vehicle of claim 1, wherein the post extending from the bottom of the seat is a clamp post comprising a base member, a swivel plate, and a spring loaded connector joining the swivel plate to the base member.

3. A ride-on vehicle, comprising:
   a frame;
   a plurality of wheels supporting the frame;
   a receiver extending from the frame at a first acute angle greater than 0° with respect to a vertical axis; and,
   a seat rotatedly connected to the frame, the seat having a mating member extending from a bottom of the seat at a second acute angle greater than 0° with respect to the vertical axis, wherein the mating member is rotatedly received by the receiver of the frame.

4. The ride-on vehicle of claim 3, further comprising a separate clamp post connected to the bottom of the seat and received in the receiver.

5. The ride-on vehicle of claim 4, wherein the clamp post comprises a base member, a swivel plate, and a spring loaded connector joining the swivel plate to the base member.

6. The ride-on vehicle of claim 3, wherein when the seat is positioned in a rear facing orientation a base portion of the seat is tilted at an acute angle greater than 0° with respect to a horizontal axis.

7. The ride-on vehicle of claim 6, wherein rotation of the seat within the receiver from a rear facing orientation to the forward facing orientation automatically causes the base portion of the seat to be positioned in the generally horizontal orientation, and wherein a relationship of the mating member and receiver prevents the base portion of the seat from being positioned in another orientation with respect to a horizontal axis when the seat is forward facing.

8. The ride-on vehicle of claim 3, wherein when the seat is positioned in a forward facing orientation a base portion of the seat is generally horizontal.

9. The ride-on vehicle of claim 8, wherein rotation of the seat within the receiver from a forward facing orientation to the rear facing orientation automatically causes the base portion of the seat to be tilted at the acute angle greater than 0° with respect to the horizontal axis, and wherein a relationship of the post and receiver prevents the base portion of the seat from being positioned in another orientation with respect to the horizontal axis when the seat is rear facing.

10. The ride-on vehicle of claim 3, wherein one of the receiver and mating member have a first detent position for the seat and a second detent position for the seat, the second detent position being rotationally positioned approximately 180° from the first detent position.

11. The ride-on vehicle of claim 10, wherein the mating member has a spring loaded clamp with a first detent position and a second detent position, wherein the seat is positioned forward facing in the first detent position, and wherein the seat is positioned rearward facing in the second detent position.

12. The ride-on vehicle of claim 10, wherein the mating member has a spring loaded first detent position and a spring loaded second detent position, wherein the seat is positioned forward facing in the first detent position, and wherein the seat is positioned rearward facing in the second detent position.

13. The ride-on vehicle of claim 3, wherein the receiver and mating member have only two detent positions for the seat, the second detent position being rotationally positioned approximately 180° from the first detent position.

14. The ride-on vehicle of claim 3, wherein the seat rotates with respect to the frame about an axis angularly offset from the vertical axis.

15. The ride-on vehicle of claim 3, wherein a longitudinal axis of the receiver is angularly offset from the vertical axis.

16. The ride-on vehicle of claim 3, wherein a longitudinal axis of the mating member is angularly offset from the vertical axis.

17. A ride-on vehicle, comprising:
a frame;
a plurality of wheels supporting the frame;
the frame having a receiver;
a seat rotatedly connected to the receiver of the frame,
a first rotational detent position for the seat with respect to the frame, the seat being positioned in a forward facing orientation in the first rotational detent position; and,
a second rotational detent position for the seat with respect to the frame, the second detent position being rotationally positioned approximately 180° from the first detent position, the seat being positioned in a rear facing orientation in the second rotational detent position, wherein when the seat is positioned in the rear facing orientation a relationship between the seat and the receiver causes a bottom of the seat to only be positioned at an acute angle greater than 0° with respect to a horizontal axis.

18. The ride-on vehicle of claim 17, further comprising a receiver extending from the frame at a first acute angle greater than 0° with respect to a vertical axis, and a post extending from the bottom of the seat at a second acute angle greater than 0° with respect to the vertical axis, and wherein the post is rotatedly received by the receiver of the frame.

19. A ride-on vehicle, comprising:
a frame;
a plurality of wheels supporting the frame;
a seat having a clamp post connected to a bottom of the seat, the clamp post comprising a base member, a swivel plate, and a spring loaded connector joining the swivel plate to the base member; and,
a receiver tube extending from the frame, the receiver tube receiving the clamp post therein, wherein the swivel plate is rotatable with respect to the base member, wherein the base member of the clamp post is rotationally and longitudinally fixed to the receiver tube, and wherein the seat rotates with the swivel plate.

20. The ride-on vehicle of claim 19, further comprising a seat post extending from the seat and into being rotationally received by the receiver, the clamp post positioned within the seat post.

21. The ride-on vehicle of claim 19, wherein the receiver tube extends from the frame at a first acute angle greater than 0° with respect to a vertical axis, and wherein the clamp post extends at a second acute angle greater than 0° with respect to the vertical axis.

22. The ride-on vehicle of claim 21, wherein the receiver tube extends at an angle between 5° and 15° with respect to the vertical axis.

23. The ride-on vehicle of claim 22, wherein the clamp post extends at an angle between 5° and 15° with respect to the vertical axis.

24. The ride-on vehicle of claim 21, wherein the first acute angle at which the receiver tube extends with respect to the vertical axis is the same angle as the second acute angle at which the clamp post extends with respect to the vertical axis.

25. The ride-on vehicle of claim 19, wherein the seat is not removed from connection with the receiver tube during transition between the forward facing orientation and the rear facing orientation.

* * * * *